United States Patent [19]

Kimura et al.

[11] Patent Number: 5,672,040

[45] Date of Patent: Sep. 30, 1997

[54] PARTS FEEDING APPARATUS AND PARTS FEEDING PROCESS

[75] Inventors: Akira Kimura, Tokyo; Tsuyoshi Inoue, Kanagawa; Naruhiko Abe, Kanagawa; Tadashi Watanabe, Kanagawa, all of Japan

[73] Assignee: Sony Corporation, Tokyo, Japan

[21] Appl. No.: 394,945

[22] Filed: Feb. 24, 1995

[30] Foreign Application Priority Data

Mar. 7, 1994 [JP] Japan ................................. 6-062082
Mar. 7, 1994 [JP] Japan ................................. 6-062083

[51] Int. Cl.⁶ .................................................. B65G 47/00
[52] U.S. Cl. ........................ 414/403; 414/278; 414/416
[58] Field of Search ............................ 414/278, 286, 414/331, 403, 416

[56] References Cited

U.S. PATENT DOCUMENTS

| | | | |
|---|---|---|---|
| 4,712,963 | 12/1987 | Kondo | 414/331 X |
| 4,783,904 | 11/1988 | Kimura | 29/786 |
| 4,883,401 | 11/1989 | Kavieff | 414/331 X |
| 4,909,697 | 3/1990 | Bernard, II et al. | 414/278 |
| 4,932,828 | 6/1990 | Katae et al. | 414/331 X |
| 5,084,829 | 1/1992 | Kato | 395/80 |
| 5,156,514 | 10/1992 | Zäh | 414/278 |
| 5,190,434 | 3/1993 | Miura et al. | 414/416 X |
| 5,435,687 | 7/1995 | Mojden et al. | 414/416 |
| 5,470,193 | 11/1995 | Miura et al. | 414/331 X |

FOREIGN PATENT DOCUMENTS

| | | | |
|---|---|---|---|
| 0 154 571 | 11/1985 | European Pat. Off. | |
| 0 499 443 | 8/1992 | European Pat. Off. | |
| 60-153308 | 8/1985 | Japan | |
| 0105825 | 5/1987 | Japan | 414/278 |
| 1040243 | 2/1989 | Japan | |
| 1115526 | 5/1989 | Japan | |
| 3098724 | 4/1991 | Japan | |
| 0678940 | 11/1991 | Switzerland | 414/278 |

*Primary Examiner*—James W. Keenan
*Attorney, Agent, or Firm*—Ronald P. Kananen

[57] ABSTRACT

To provide a compact parts feeding apparatus capable of reducing the parts stock in the line, and facilitate between different kinds of devices, a first transfer unit 200A of a transferring and positioning arrangement 200C of a parts feeding apparatus 200, transfers a tray T carrying parts PB upward in a first direction Z1 from conveyor arrangement 14. A positioning unit 200D the tray T carrying the parts PB in a determined position within the assembling range of a assembling body 10 from the first transfer unit 200A. A second transfer unit 200B descends in a second direction Z2 opposite to the first direction, to transfer the positioned tray T to the first transfer unit 200a or to discharge the tray T after it has been emptied of parts onto the conveyor arrangement 14.

12 Claims, 29 Drawing Sheets upper stage separator lower stage separator lower stage separator upper stage separator lower stage separator upper stage separator intermediate stage separator tray return portion upper stage separator tray return portion

PARTS FEEDING APPARATUS AND PARTS FEEDING PROCESS

BACKGROUND OF THE INVENTION

1. Field of the Invention

The present invention relates to a parts feeding apparatus and parts feeding process for feeding a plurality of different kinds of parts to be assembled into a predetermined piece of work.

2. Description of the Related Art

In case a precise and complex device such as the mechanical deck of a tape recorder or VTR is to be assembled, a plurality of different kinds of parts are assembled by an assembling robot which is usually fed with the parts by a parts feeding apparatus. The number of parts to be assembled by the prior art assembling robot is usually limited to one or two, for example.

This type of parts feeding apparatus is exemplified by a parts feeder, a tray changer, a magazine feeder or a hoop feeder. One or two of these parts feeding arrangements is usually included in the assembling robot. The thus built in parts assembly therein feeds the assembling robot with the parts for assembly therein. However, this type of parts feeding apparatus is almost always arranged to handle specific type of parts whereby when the parts to be assembled are changed in accordance with a change in the kind of device being assembled, the parts feeding apparatus and the robotic hands have to be manually changed or adjusted. Thus, the following problems arise with the prior art parts feeding apparatus.

In the case fourteen kinds of parts (for example) are to be assembled to form a given piece of work, fourteen different parts feeding apparatus have to be used and thus enlarges total size of the arrangement drastically. Further, in order to allow the assembling robot to take the individual parts from the fourteen different parts feeding the assembling robot has to have a large operating range so that its body is accordingly enlarged.

If, on the other hand, one or two parts are to be assembled in one assembling robot cell by dividing the steps, the line space is enlarged to deteriorate the space efficiency. In order to minimize the feeding interval (or time) and number of the parts, moreover, the parts to be stocked in the parts feeding apparatus has to be retained in a proper amount, thus increasing the parts stock in the assembly line. At the time of changing the device kinds, on the other hand, the parts feeding apparatus and the robot hands of the assembling robot have to be time consumingly manually exchanged and adjusted.

Therefore, the present invention has been conceived to solve the above-specified problems and has an object to provide a parts feeding apparatus capable of sparing space, reducing the parts stock in the line and easily coping with a change in the device being assembled.

SUMMARY OF THE INVENTION

The object of this invention is to provide a parts feeding apparatus for feeding parts for a given piece of work, on a tray to an assembling body for assembling the parts, comprising: conveyor means for conveying said parts carrying tray to said assembly body or from the same to the outside; and transferring and positioning means for transferring and positioning a plurality of said trays, which are conveyed by said conveyor means to said assembling body, wherein said transferring and positioning means includes: a first transfer unit for transferring said parts carrying tray upward in a first direction from said conveyor means; a positioning unit for positioning said parts carrying tray from said first transfer unit in a determined position within the assembling range of said assembling body; and a second transfer unit either for transferring said parts carrying tray positioned in said determined position, downward in a second direction reversed from said first direction, to said first transfer unit or for discharging said tray emptied of said parts toward conveyor means.

Another object of this invention is a parts feeding process for feeding a plurality of parts to be assembled into a predetermined piece of work, to an assembling body for assembling said parts, comprising: the step of taking a tray carrying said parts necessary for the assembly into said assembly body; the step of transferring the taken and parts carrying tray upward in a first direction and positioning the same; the step of further transferring said taken and parts carrying tray and positioning within the operating range of said assembly body; the step of transferring, after the parts carrying tray positioned in the operating range of said assembly body has its parts necessary for said assembly removed by said assembling body, either a parts carrying tray or said tray which is emptied of said parts, downward in a second direction opposite to said first direction; and the step of again transferring said parts carrying tray upward in said first direction to position the same within the operating range of said assembling body and for discharging said tray emptied of said parts from the inside of said assembling body.

According to the above-specified construction, by the action of the conveyor means, the tray carrying the parts is conveyed to or from the assembling body.

Moreover, the transferring and positioning means transfers and positions the plurality of trays, which are conveyed to the assembling body by said conveyor means, in the assembly body. The first transfer unit of this transferring and positioning means moves the parts carrying tray upward in the first direction from the conveyor means.

The positioning unit positions the parts carrying tray from the first transfer unit in the determined position within the assembling range of the assembling body.

The second transfer unit transfers the positioned and parts carrying tray downward in the second direction reversed from the first direction, to the first transfer unit. Alternatively, the second transfer unit transfers the positioned tray emptied of its parts, downward in the second direction to the conveyor means.

DESCRIPTION OF THE PREFERRED EMBODIMENT

A preferred embodiment of the present invention will be described in detail in the following with reference to the accompanying drawings.

Incidentally, the embodiment to be described is a preferred specific one of the present invention and is accordingly restricted by a variety of technically preferable limitations. However, the scope of present invention should not be considered limited thereby, unless it is specified in the following description.

Assembling System

Figure 1:
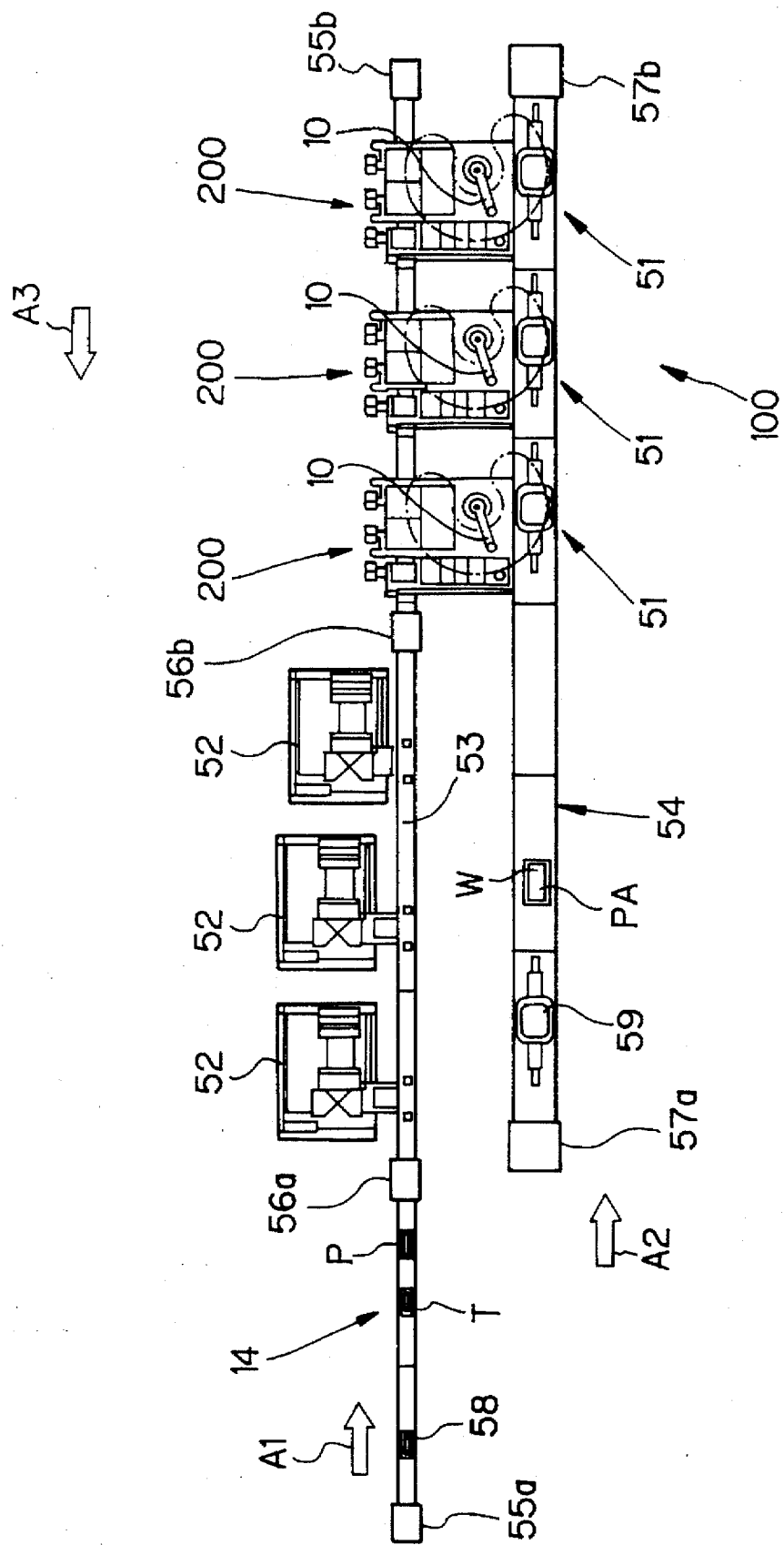
FIG. 1 is a top plan view showing a multi-kind small-quantity production type assembly system equipped with a preferred embodiment of the parts feeding apparatus of the present invention.

FIG. 1 shows an assembling system for multi-kind and small-quantity production, which is equipped with a preferable embodiment of a parts feeding apparatus of the present invention. This assembling system is schematically constructed to include an assembling robot unit 100, a parts feeding conveyor 14, an assembling conveyor 54 and parts feeding units 200. This assembling system is an apparatus for the multi-kind and small-quantity production, which is enabled to assemble fourteen parts (or fifteen or sixteen parts according to the thickness of a tray) for a work in one of robot cells 51 of the assembling robot unit 100 by feeding those parts to the robot cell 51. In the shown embodiment, the assembling robot unit 100 is equipped with three assembling robot cells 51. These robot cells 51 are also called the assembly bodies.

Each robot cell 51 is set with the parts feeding unit 200 of the present invention. The parts feeding conveyor 14 and the assembling conveyor 54 are arranged in parallel with the assembling robot unit 100.

Parts Feeding Conveyor 14

Here will be described the parts feeding conveyor 14.

This parts feeding conveyor 14 is composed, for example, of three parts feeders 52, a transfer conveyor 53, return units 55a and 55b, and intermediate return units 56a and 56b. The parts feeding conveyor 14 is provided for conveying both trays T carrying parts and pallets P carrying other kinds of parts in the flow direction A1 of parts. The return units 55a and 55b are respectively arranged at the front end portion and the rear end portion of the transfer conveyor 53. Moreover, the intermediate return units 56a and 56b are respectively arranged at the front end portion and the rear end portion of the three parts feeders 52. On the other hand, a loading station 58 is disposed downstream of the return unit 55a.

On the other hand, the assembling conveyor 54 is provided for conveying pallets PA carrying pieces of work or works W as they will be referred to to the individual robot cells 51 in the direction of arrow A2. The assembling conveyor 54 is composed of return units 57a and 57b and a take-out station 59. This take-out station 59 is a unit for taking out the completed assembly of the plurality of kinds of parts for the base (or chassis) of a VTR device, for example, from the assembling conveyor 54.

The parts to be assembled into the work W are carried by the trays T and the feed pallets P. The trays T can be exemplified by foamed polymer trays. The trays T carrying the parts and the pallets P for the parts feeders 52 can be brought from the loading station 58 to the parts feeding conveyor 14 and transferred by the transfer conveyor 53. The pallets P thus transferred are taken into and arrayed by a predetermined one of the parts feeders 52 so that they are loaded with a predetermined kind of parts. Then, the pallets P are returned to the conveyor 53 until they are fed to the robot cells 51. On the other hand, the trays T are already loaded with the parts, when they are brought to the loading station 58, so that they are directly fed to the robot cells 51 or the assembling cells.

The assembling pallet PA thus supplied from the take-out station 59 is positioned in the predetermined robot cell 51. For the work W on the pallet PA, moreover, the predetermined kinds of parts on the pallet P or the tray T are assembled by the assembling robot 10 of the robot cell 51. When the parts necessary for the assembly are exhausted during assembly, the tray T or the pallet P is returned by the robot cell 51 to the parts feeding conveyor 53 so that it is returned by the return unit 55b and conveyed in the direction of arrow A3 by the lower stage conveyor of the conveyor 53.

The pallet P is returned by the intermediate return unit 56a to the upper stage conveyor of the parts feeding conveyor 14 and is taken up by the parts feeder 52. On the other hand, the tray T is returned by the return unit 55a to the upper stage conveyor until it is replaced by a new tray carrying the parts at the loading station 58.

The pallet P supplied with the parts and the tray T carrying the parts are transferred again to the robot cells 51 by the conveyor 53. At this time, the robot cells 51 are awaiting the pallet P and the tray T necessary for the assembly.

The pallet P and tray T unnecessary or mistaken in order is passed, if at the predetermined position, through the robot cells so that they are circulated till they are required by the return unit 55b and the intermediate return unit 56a.

On the other hand, when the works W are changed in the kinds to exchange the kind of device to be assembled of the parts, the pallets P and the trays T for the former device kind are unloaded from the loading station 58, and this station 58 is loaded with the pallets P and the trays T for the next kind. At this time, the parts of the previous kind in the hoppers of the parts feeders 52 are replaced by the parts for the subsequent kind. However, the common parts are left in the hoppers.

Thus, the kinds of device can be interchanged by replacing the pallet heads and the pallets, which are stocked in the super-pallet changers in the robot cells 51.
Robot Cell 51

Figure 2:
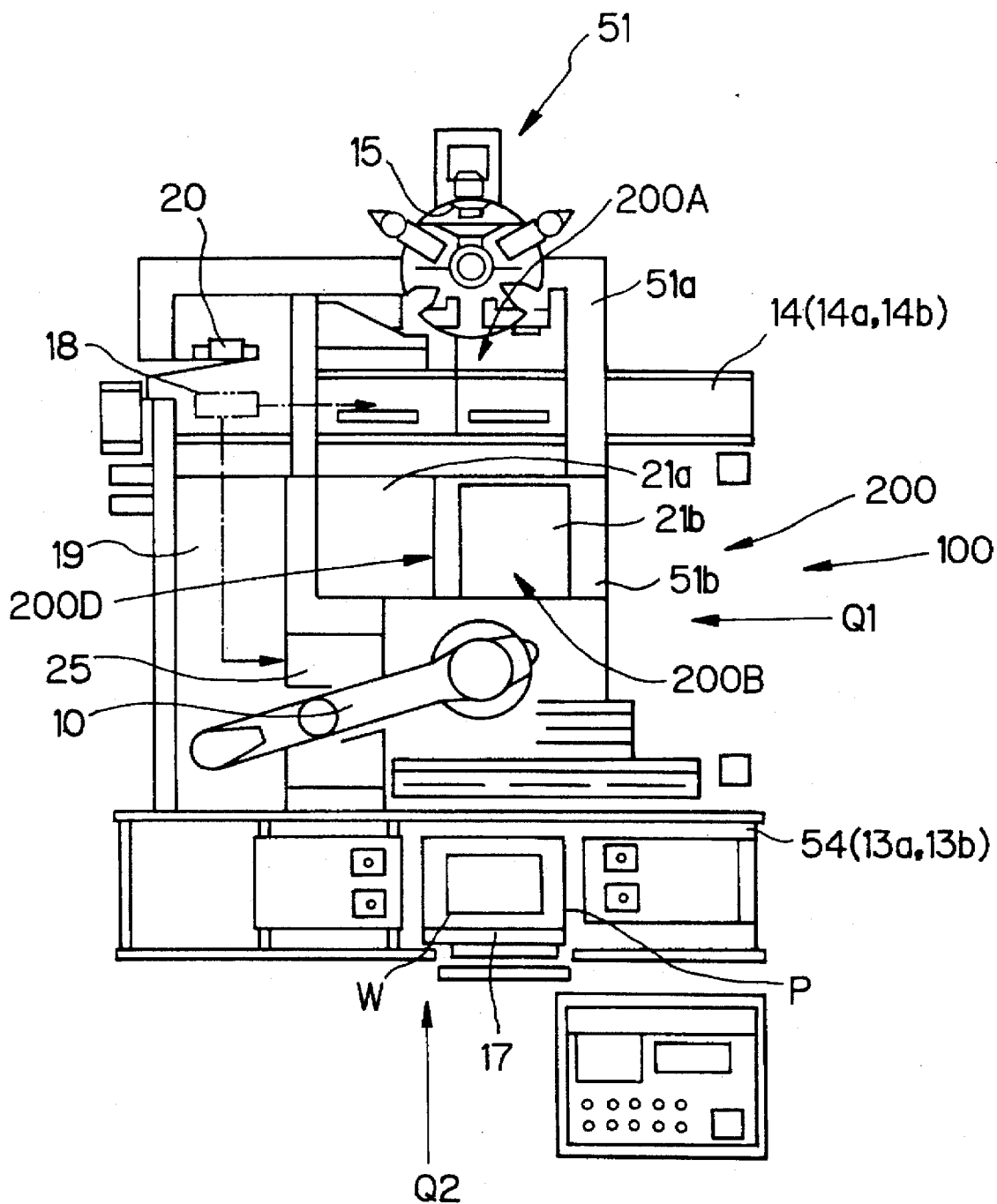
FIG. 2 is a top plan view showing an assembly cell (or robot cell) equipped with the preferred embodiment of the parts feeding apparatus, as shown in FIG. 1.
Figure 3:
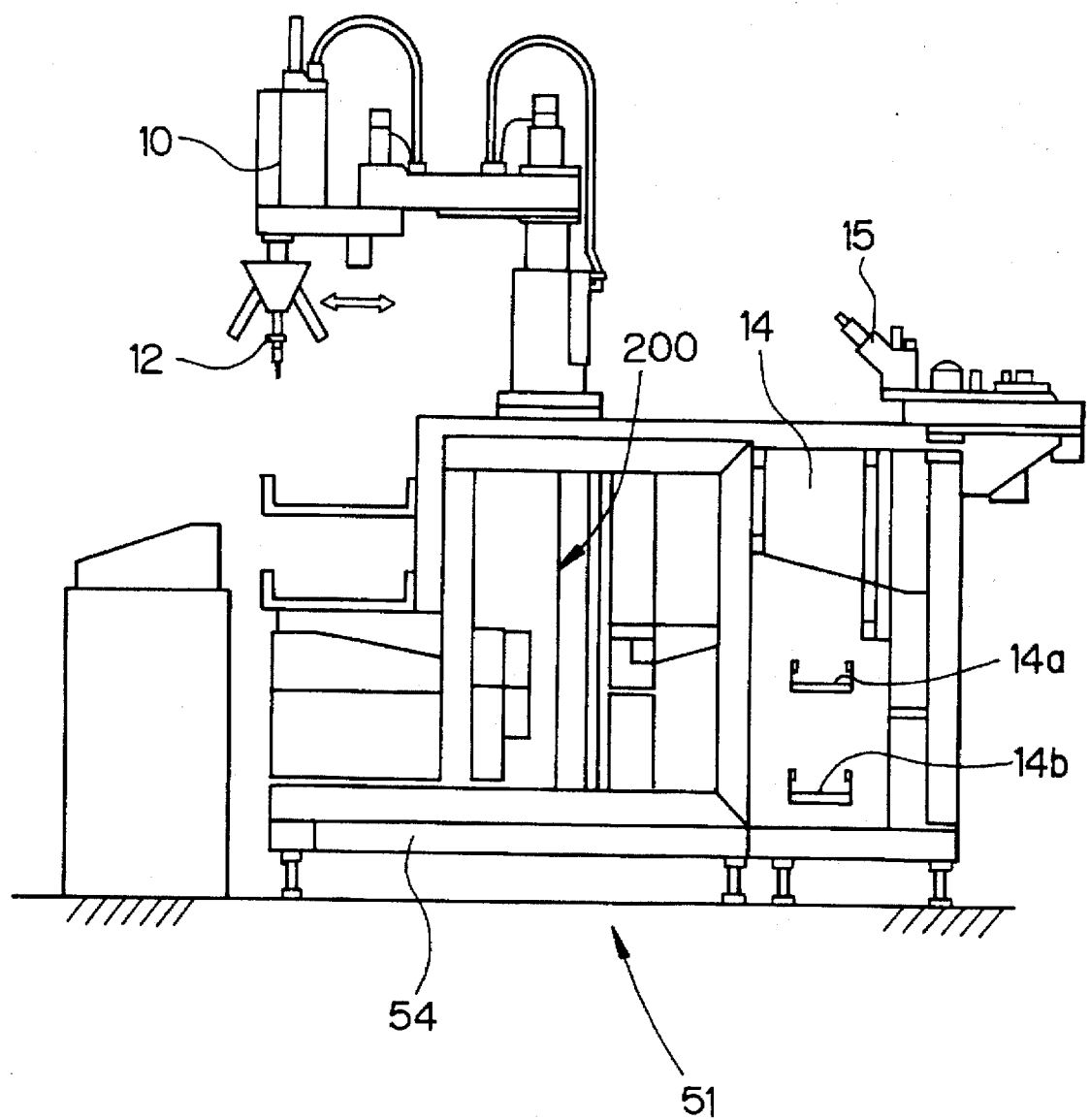
FIG. 3 is a side elevation of the robot cell, as seen in the direction of Q1 of FIG. 2.
Figure 4:
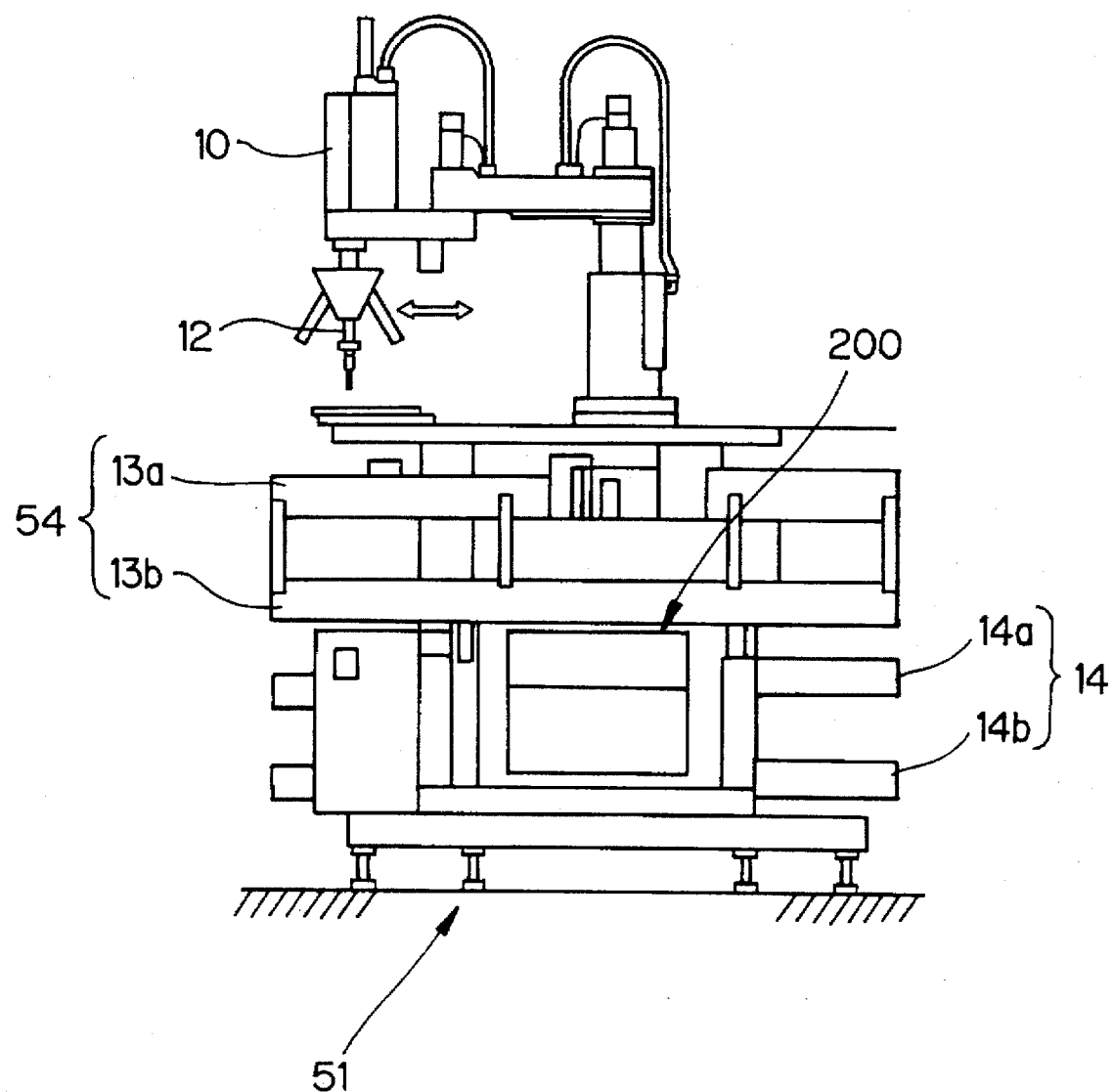
FIG. 4 is a side elevation of the robot cell, as seen in the direction of Q2 of FIG. 2.

Reference will be made to FIGS. 2 to 4. In FIGS. 2 to 4 showing the parts assembling robot cell 51 (or assembling body): FIG. 2 is a top plan view of the robot cell 51; FIG. 3 is a side elevation taken in the direction of arrow Q1 of FIG. 2; and FIG. 4 is a side elevation taken in the direction of arrow Q2 of FIG. 2. This robot cell 51 is given a construction, as will be described in the following. As shown in FIGS. 3 and 4, the robot 10 of the robot cell 51 is equipped with a turret head 12 capable of mounting six hands, for example, at the maximum. These hands are mounted for gripping the parts which are carried on the aforementioned pallet P or tray T.

As shown in the top plan view of FIG. 2, there are extended through the frame 51a of the robot cell 51 an upper stage conveyor 14a and a lower stage conveyor 14b of the parts feeding conveyor 14. Across the frame 51b, moreover, there is extended the assembling conveyor 54. This assembling conveyor 54 is also equipped with upper and lower stages 13a and 13b. A super-pallet changer 15 has the turret heads stocked therein for the fourteen kinds of parts, so that the necessary turret heads can be automatically exchanged between the super-turret changer 15 and the turret head 12.

A pallet lifter 20 of FIG. 2 is provided for taking the pallet P carrying the parts from the upper stage conveyor 14a of the parts feeding conveyor 14 into the robot cell 51. For taking in the pallet, there is used a pusher 18. A pallet buffer 19 for buffering the pallet P thus taken in is disposed in the vicinity of the pallet lifter 20.

A pallet positioning unit 25 is one for positioning the pallet P for taking up the parts carried on the pallet P by the robot 10. The parts feeding unit 200 is preferably arranged in the frame 51a of the robot cell 51 and is equipped with two elevator units 21a and 21b. Each elevator unit 21a or 21b of the parts feeding unit 200 is used to feed the plurality of aforementioned trays T sequentially and circularly in the assembling cell 51.

The aforementioned pallet P of FIG. 1 is fed in the parts feeder 52 with the parts by vibrations. On the contrary, the tray T is preferably used to feed the parts which cannot be vibratorily fed. As shown in FIG. 2, the assembling conveyor 54 is equipped with an assembling pallet positioning unit 17. This positioning unit 17 positions the assembling pallets PA so as to assemble the parts for the work.

In the robot cell 51 of FIGS. 2 to 4, the following operations are carried out. The pallet P and the tray T are conveyed while carrying the parts by the upper stage conveyor 14a of the parts feeding conveyor 14 are discriminated by the pallet lifter 20. If this discrimination reveals that the pallet P carrying the necessary parts has reached the pallet lifter 20, the pallet P is lifted up as it is (i.e., in a direction normal to the sheet of FIG. 2) and taken in by the pallet buffer 19 so that it is transferred to the parts pallet positioning unit 25 by the robot 10.

If, on the contrary, the discrimination reveals that the tray T carrying the necessary parts has reached the pallet lifter 20, it is taken and positioned in the assembling order to the elevator units 21a and 21b, unlike the case of the pallet P.

On the other hand, the assembling pallet P having been conveyed by the assembling conveyor 54 is positioned by the pallet positioning unit 17. In this state, the assembling of the predetermined parts are started for the work W on the assembling pallet P. At this assembling time, the trays T are circulated in the assembling order in the elevator units 21a and 21b of the parts feeding unit 200 and are positioned in determined positions DP. As a result, ten kinds of parts, for example, can be fed to the pallet head 12 of the robot 12. In case the turret head 12 is to be exchanged as the parts feeds of the elevator units 21a and 21b, it is replaced by that which is stocked in the super-pallet changer 15, to prepare the next assembling operations. When the tray T has its parts exhausted as the assembly proceeds, it is discharged to the lower stage conveyor 14b of the parts feeding conveyor 14.

In case the pallet P has its parts exhausted, on the other hand, the pallet P of FIG. 2 is transferred to the pallet buffer 19 by the robot 10 and is returned to the pallet lifter 20 and discharged to the upper stage conveyor 14a of the parts feeding conveyor 14 by the action of the pallet take-in pusher 18. When the tray T carrying no parts is discharged to the lower stage conveyor 14b, the remaining trays T in the elevator unit 21a are held on standby without any circulation till the elevator unit 21a is fed with a new tray T carrying the parts. When this new tray T is fed, the individual trays T are then circulated and fed at all times without any change in the assembling steps so that the multi-kind and small-quantity production can be accomplished.
Parts Feeding Unit 200

Figure 5:
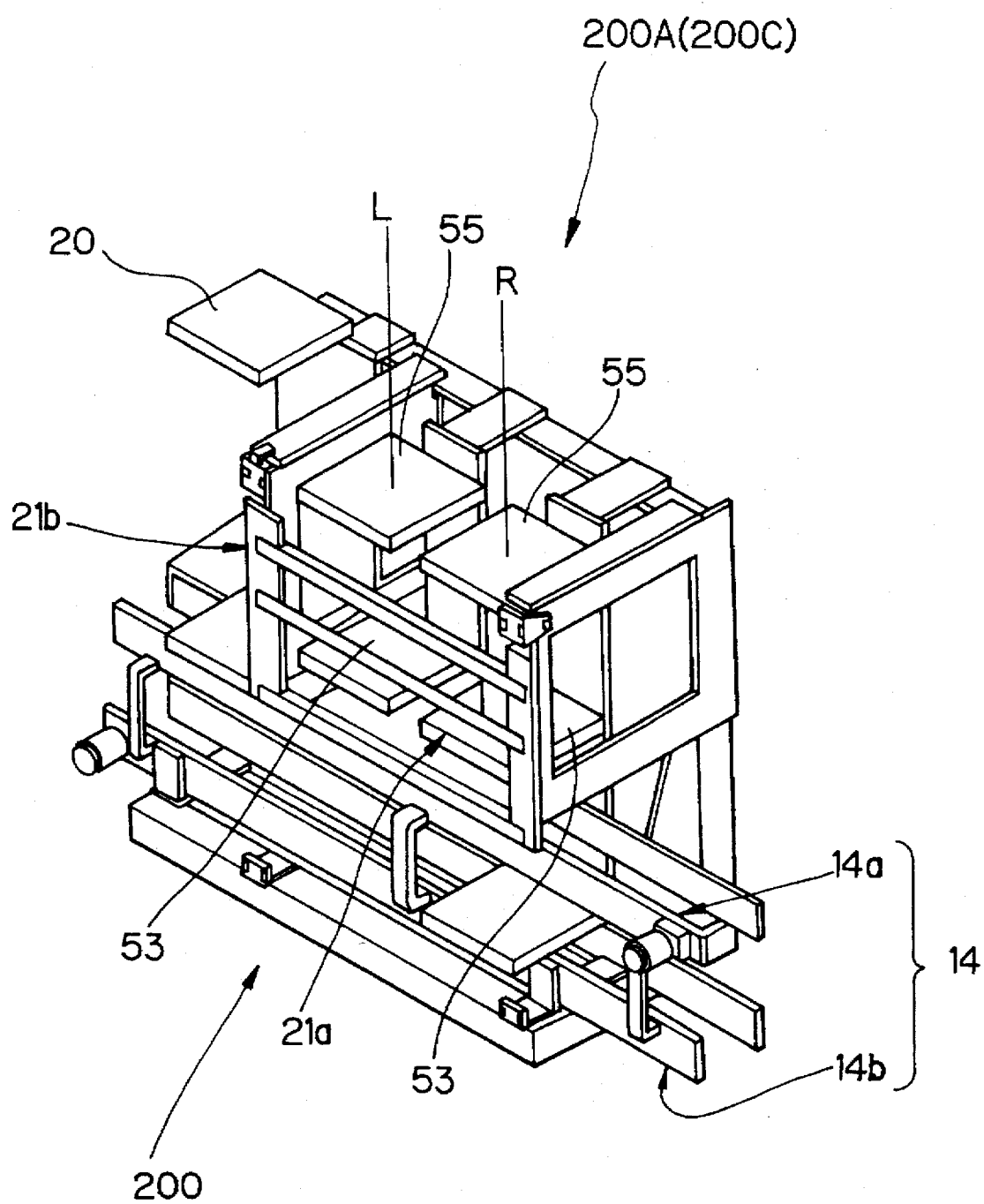
FIG. 5 is a perspective view showing a take-in (induction) unit of the parts feeding apparatus of the present invention.
Figure 6:
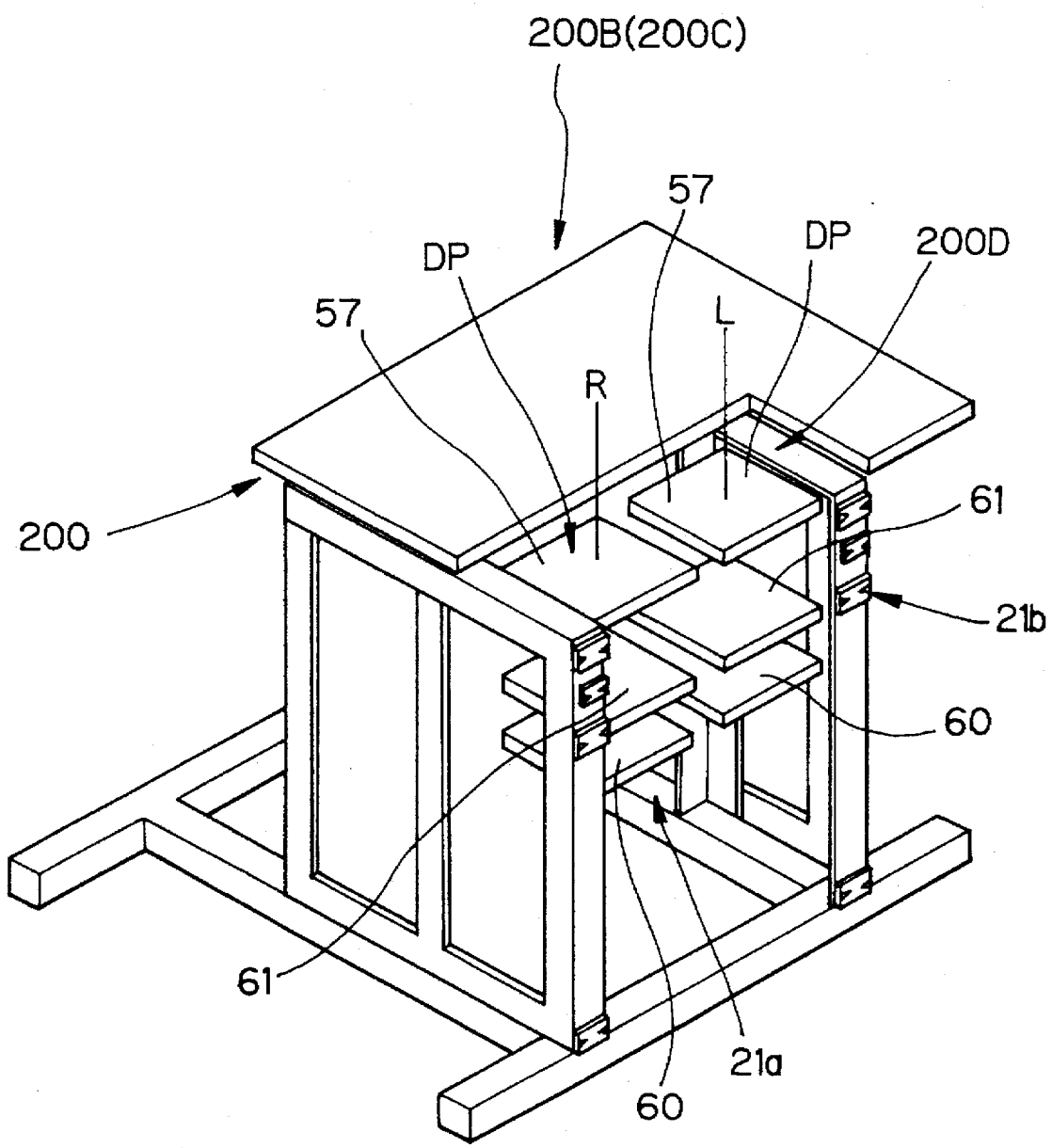
FIG. 6 is a perspective view showing a take-out (discharge) unit of the parts feeding apparatus of the present invention.

FIG. 5 shows a take-in unit 200 of the parts feeding unit 200, as shown in FIG. 1, for taking in the trays T, and FIG. 6 shows a take-out unit 200B for the trays T. These take-in unit 200 and take-out unit 200B are the parts feeding units to be used in combination, as shown in FIG. 2, for circulating the trays T, and are arranged in the robot cell 51, as shown in FIGS. 2 to 4.

This parts feeding unit 200 is schematically composed, as shown in FIGS. 5 and 6, of the parts feeding conveyor 14 and transferring/positioning means 200C for the trays T. This transferring/positioning means 200C is composed of: the take-in unit 200A acting as a first transfer unit for the trays T; the take-out unit 200B acting as a second transfer unit for the trays T; and a positioning unit 200D for the trays T.

The parts feeding unit 200 takes in the trays T carrying the parts of the kind necessary for one robot cell 51, e.g., ten kinds of parts from the upper stage conveyor 14a of the parts feeding conveyor 14. Moreover, the plurality of trays T thus taken in are circulated in the take-in unit 200A and the take-out unit 200B of the parts feeding unit 200 so that the trays having the parts unloaded therefrom can be discharged to the lower stage conveyor 14b. As shown in FIGS. 5 and 6, the elevator unit 21a constitutes the circulation conveyor at the righthand (R) side, and the elevator unit 21b corresponds to the circulation conveyor at the lefthand (L) side. These elevator units 21a and 21b are given substantially the same constructions.

Parts Feeding Conveyor 14

Figure 7:
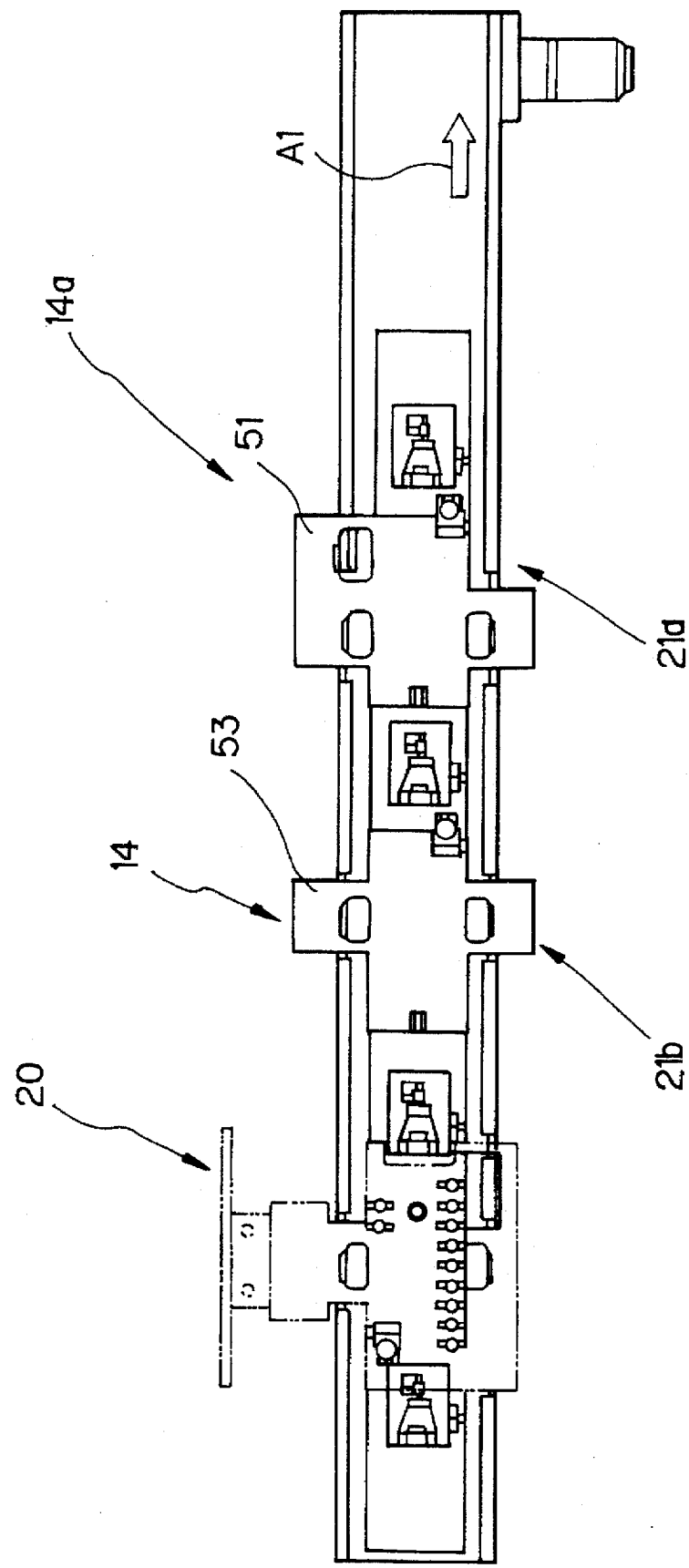
FIG. 7 is a top plan view showing an upper stage conveyor of a parts feeding conveyor.
Figure 8:
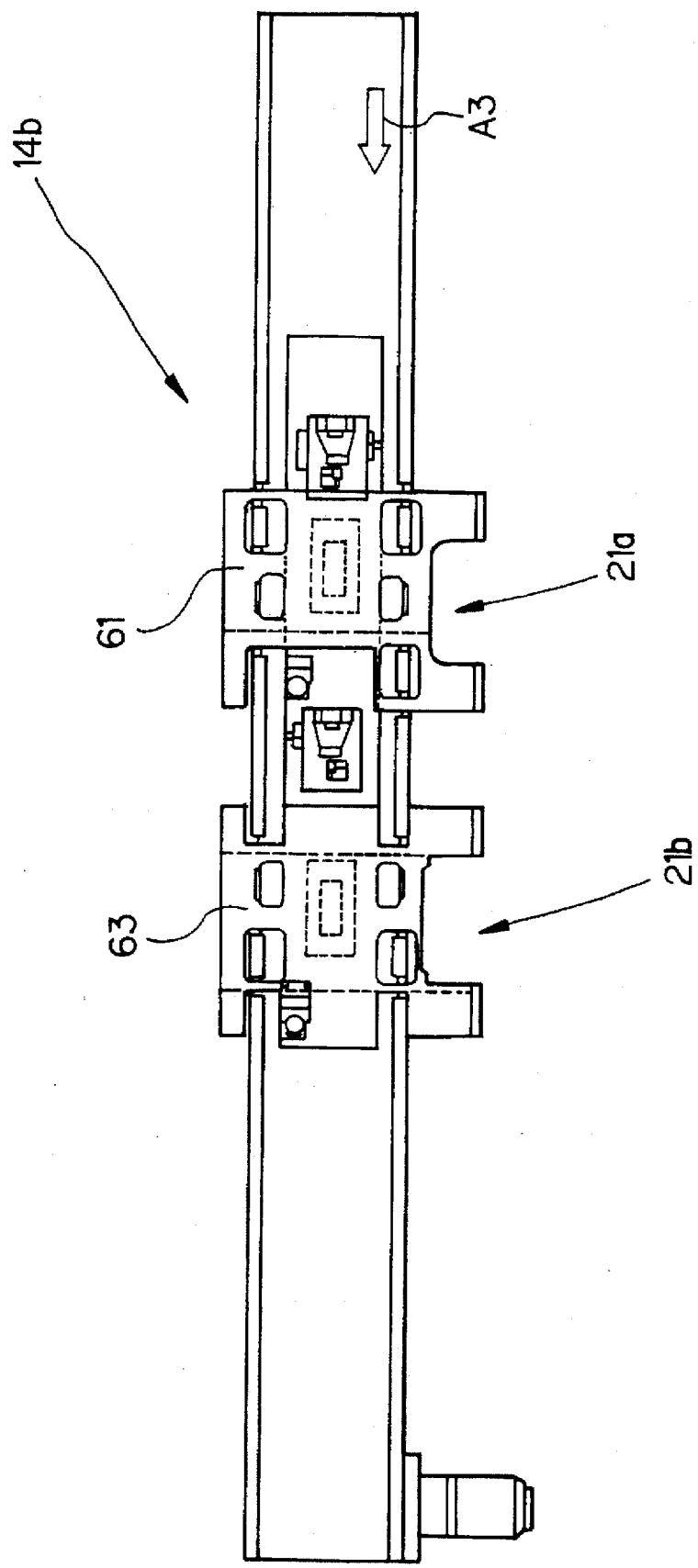
FIG. 8 is a top plan view showing a lower stage conveyor of the parts feeding conveyor.

As shown in FIG. 6, over each of the elevator units 21a and 21b, there is disposed the positioning unit 200D for the trays T. As shown in FIG. 2, this positioning unit 200D is one for positioning the trays T in the determined position DP within the operating range of the robot 10. The parts feeding conveyor 14, as shown in FIG. 5, is equipped with the upper stage conveyor 14a and the lower stage conveyor 14b. Of these, the upper stage conveyor 14a is shown in FIG. 7, whereas the lower stage conveyor 14b is shown in FIG. 8. The upper stage conveyor 14a of FIG. 7 is one for introducing the trays T and is equipped with the tray detecting unit 20 and the conveyor lifters 53 and 51 to convey the trays T in the direction of arrow A1.

On the other hand, the lower stage conveyor 14b of FIG. 8 is one for discharging the trays T and is equipped with lifters 63 and 61. The lifter 53 of FIG. 7 and the lifter 63 of FIG. 8 correspond to the elevator unit 21b of FIG. 5, as located at the lefthand side. On the other hand, the lifter 51 of FIG. 7 and the lifter 61 of FIG. 8 correspond to the elevator unit 21a, as located at the righthand side. The detecting unit 20 of FIG. 7 can detect the trays T and the pallets P being conveyed, to discriminate the kinds of the devices, stations and parts.

Thus, the upper stage conveyor 14a of FIG. 7 discriminates and takes in the necessary trays T. On the other hand, the lower stage conveyor 14b returns the trays T and receives the empty trays T for the elevator unit. Since the elevator units 21a and 21b shown in FIGS. 5 and 6 are given the similar constructions, the structure of one elevator unit 21 will be described with reference to FIGS. 9 to 11.

Figure 9:
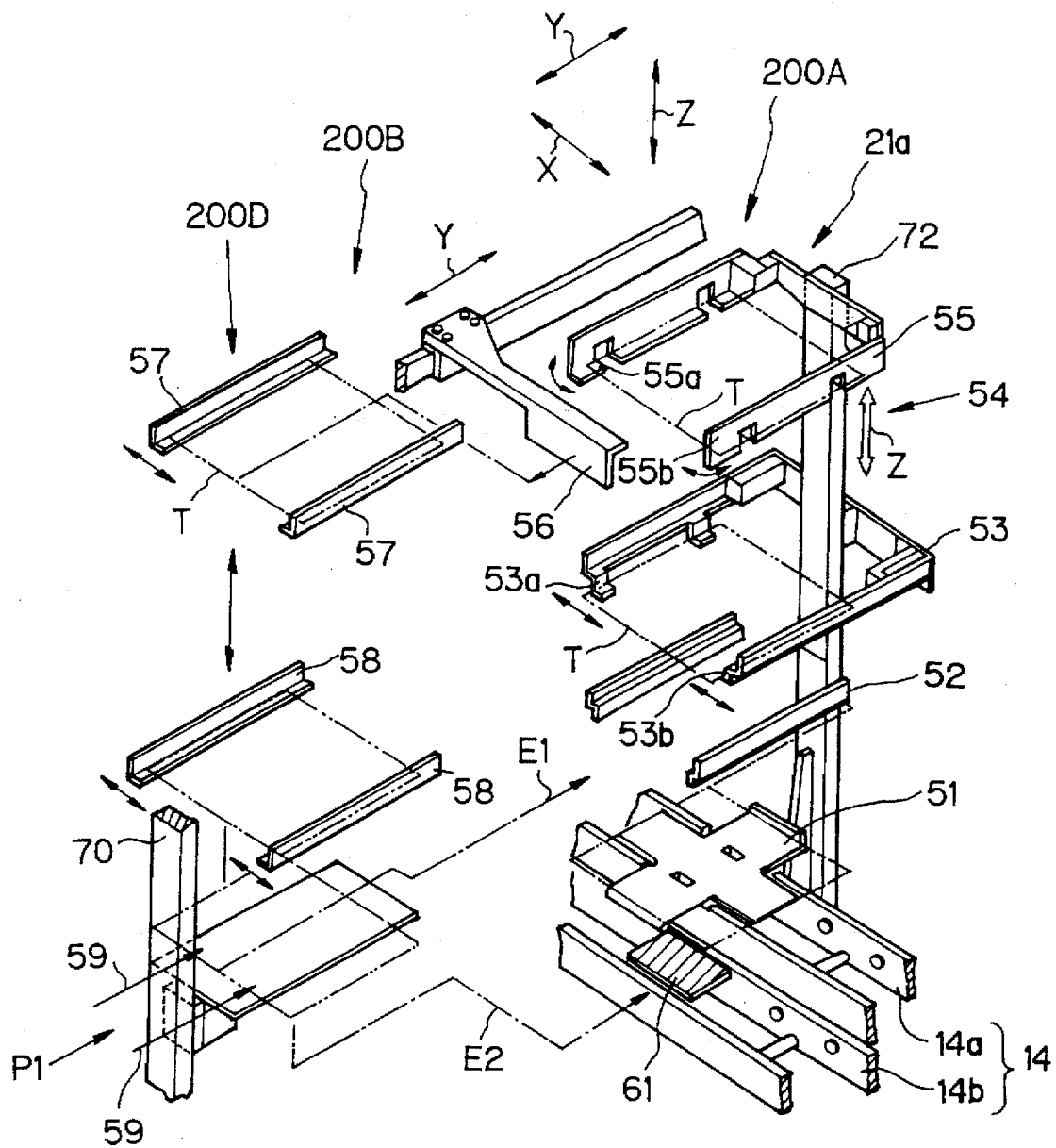
FIG. 9 is a perspective view showing an example of the components of a portion of the parts feeding apparatus.
Figure 10:
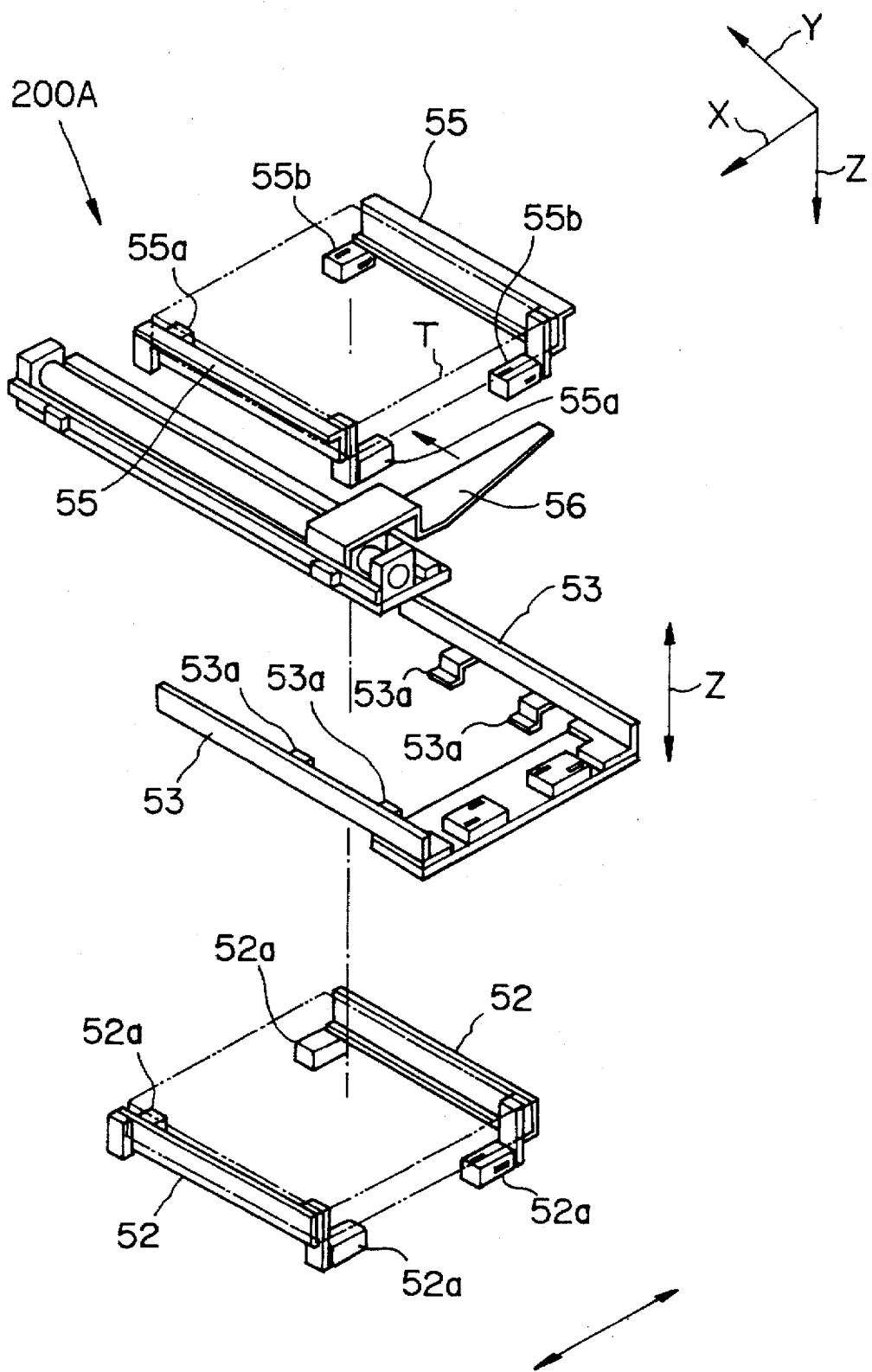
FIG. 10 is a perspective view showing an example of a portion of the elements of a take-in unit of the parts feeding apparatus.
Figure 11:
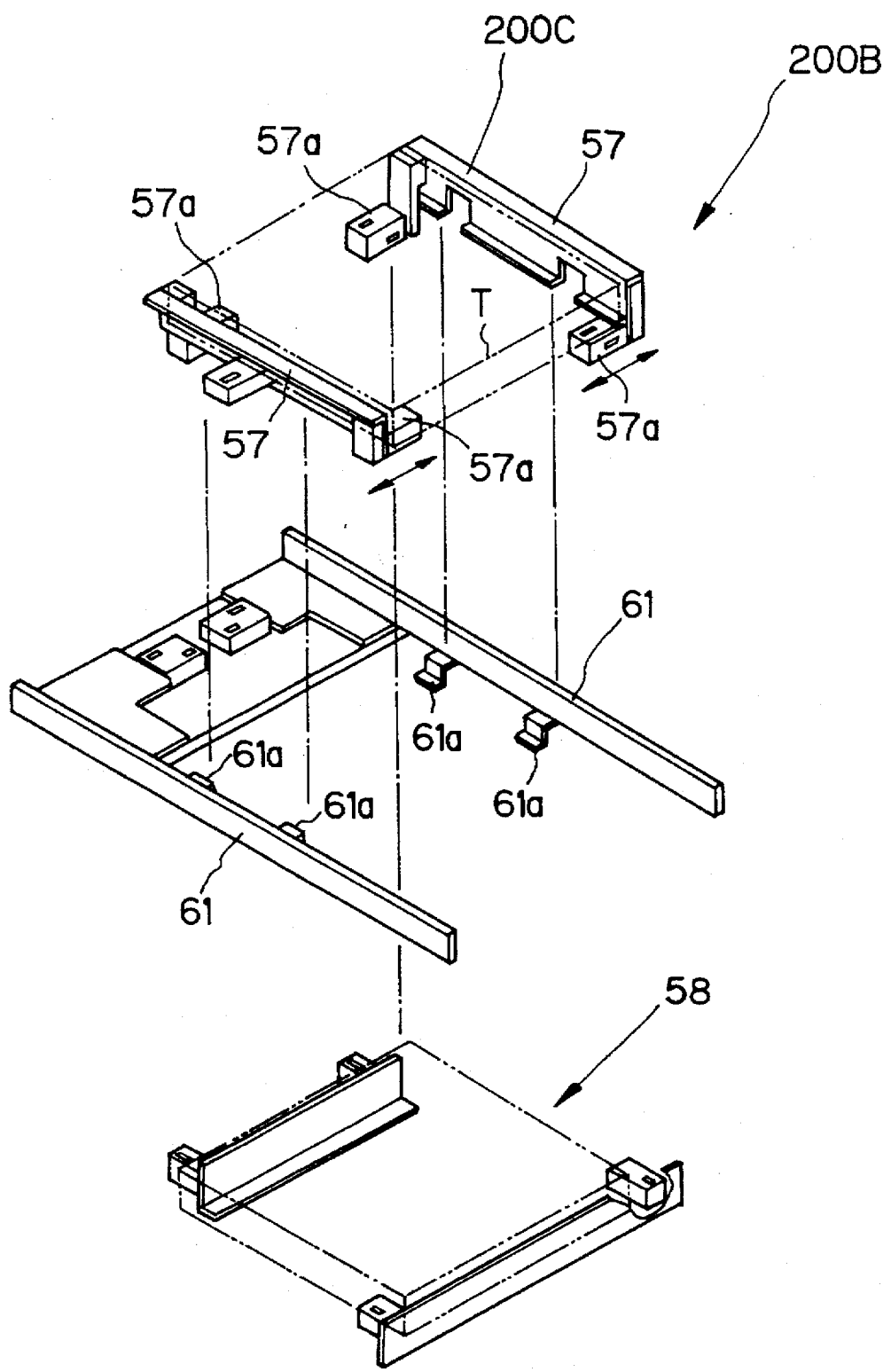
FIG. 11 is a perspective view showing an example of a portion of the elements of a take-out unit of the parts feeding apparatus.

FIG. 9 shows the elevator unit 21a, which is equipped with the take-in unit 200A as the first transfer unit and the take-out unit 200B as the second transfer unit. Moreover, FIG. 10 shows the components of the take-in unit 200A, and FIG. 11 shows the components of the take-out unit 200B.

Take-in Unit 200A for Trays T

First of all, the take-in unit 200A will be described with reference to FIGS. 9 and 10.

This take-in unit 200A is positioned above the upper stage conveyor 14a. Over the lifter 51 of the upper stage conveyor 14a, there are disposed the separator 52, the elevator hanger 53 and the tray setter 55.

The separator 52 can be opened and closed in the directions of arrows X to retain or release the tray T.

The tray setter 55 is positioned above a support 72 so that it is enabled to retain or release the tray by opening or closing its pawls 55a and 55b.

On the other hand, the elevator hanger 53 can move up and down along the support 72 in the directions of arrows Z. The elevator hanger 53 is enabled to retain or release the tray T by opening or closing its pawls 53a in the direction of arrows.

In addition, the tray pusher 56 is provided in association with the tray setter 55. The tray pusher 56 can be moved in the directions of arrows Y to move the tray T held by the tray setter 55 toward the tray setter 57 of the take-out unit 200B.

Take-out Unit 200B for Trays T

Here will be described the take-out unit 200B with reference to FIGS. 9 and 11.

The take-out unit 200B is composed of a tray setter 57, an elevator hanger 61, a return elevator 60, a return separator 58 and a support 70. The tray setter 57 is also known as a "take-out upper stage separator" and is enabled to retain or release the tray T by opening or closing its pawls 57a.

This tray setter 57 forms part of the aforementioned positioning unit 200D for the trays T. The tray setter 57 is enabled to retain or release the tray T by opening or closing in the directions of arrows. Moreover, the return separator 58 is also called the "take-out intermediate separator" and is enabled to retain or release the tray T by opening or closing in the directions of arrows, as shown in FIG. 9. The elevator hanger 61 of FIG. 11 is formed with pawls 61a so that it is enabled to retain or release the tray T by opening or closing its pawls 61a.

Figure 12:
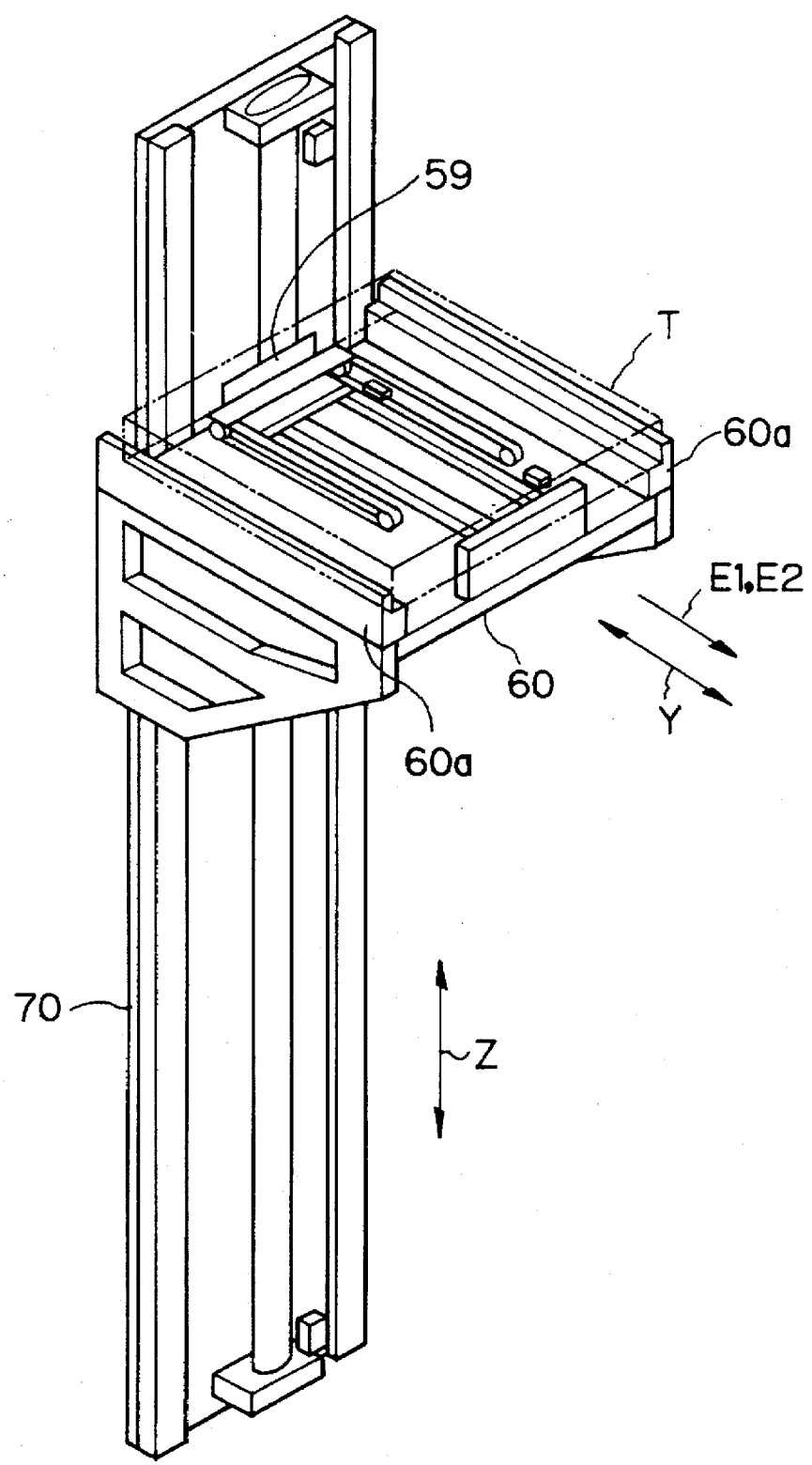
FIG. 12 is a perspective view showing a return elevator of the take-out unit.

The return elevator 60 of the take-out unit 200B, as shown in FIG. 12, can move in the Z directions between positions P1 and P2 of FIG. 9 along the support 70. In the state of FIG. 12, there are placed on the return elevator 60 the guides 60a, on which is carried the tray T, as indicated by double-dotted lines. The return elevator 60 is equipped with the take-out pusher 59 called the "return pusher".

This take-out pusher 59 can push the tray T in the direction of arrow E1, as shown in FIG. 9, to the separator 52 of the take-in unit 200A. In short, the tray T is returned from the take-out unit 200B to the take-in unit 200A of FIG. 9. In case, moreover, the tray T is to be returned to the separator 52 of the take-in unit 200A so that it may be circulated between the take-in unit 200A and the take-out unit 200B, the return elevator 60 is positioned at the position P1, as shown in FIG. 9.

In case, on the contrary, the return elevator 60 of FIG. 2 is in the position P2, the empty tray T placed on the return elevator but having no parts can be discharged or let off to the side of the return lifter 61 of FIG. 9 by actuating the return pusher 59.

Figure 13:
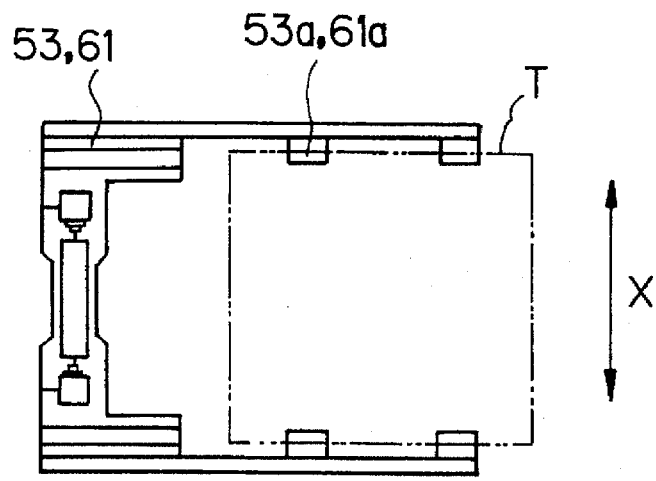
FIG. 13 is a top plan view showing a hanger of the take-in unit and the take-out unit.
Figure 14:
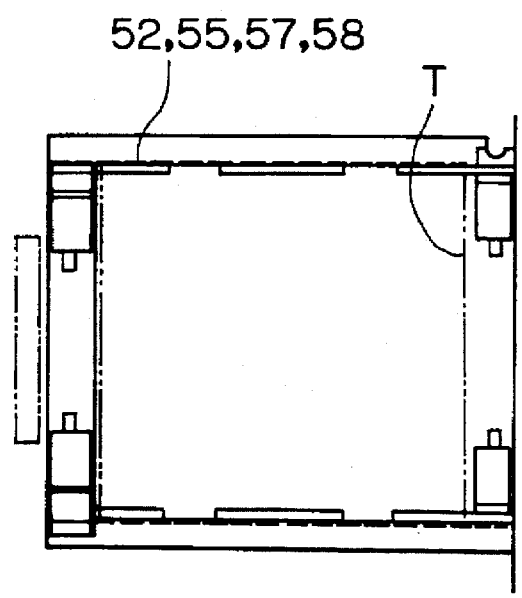
FIG. 14 is a top plan view showing a separator of the take-in unit and the take-out unit.
Figure 15:
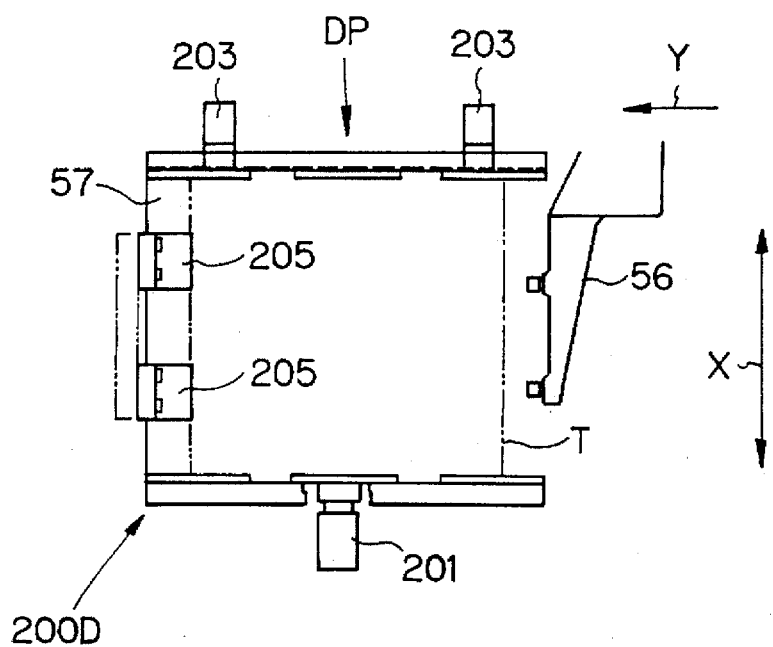
FIG. 15 is a top plan view showing an upper stage separator and a positioning unit of the take-out unit.

Reference will be made to FIGS. 13 to 15.

Figure 28:
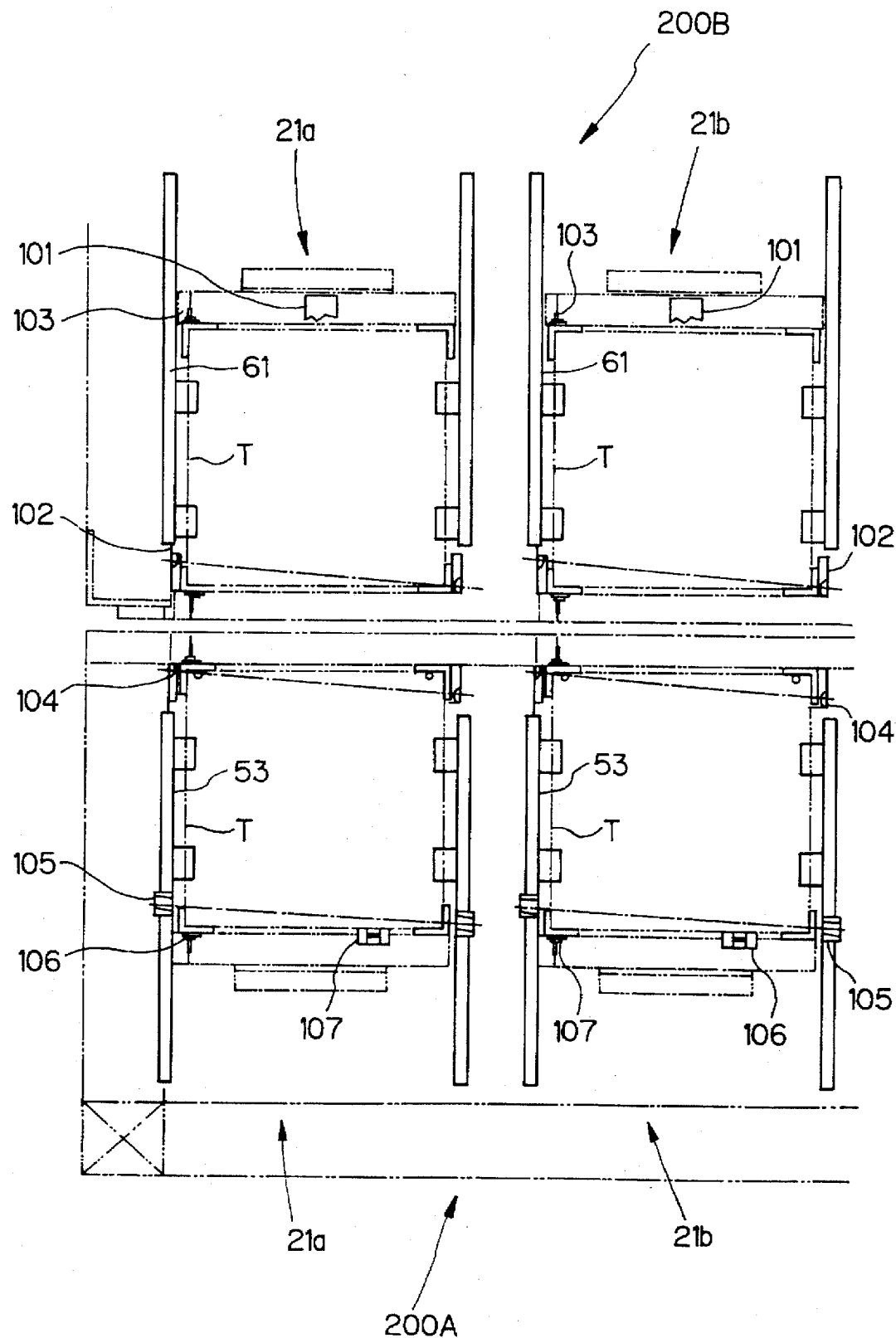
FIG. 28 is a top plan view showing a set of tray detecting sensors in the take-in unit and the take-out unit.
Figure 29:
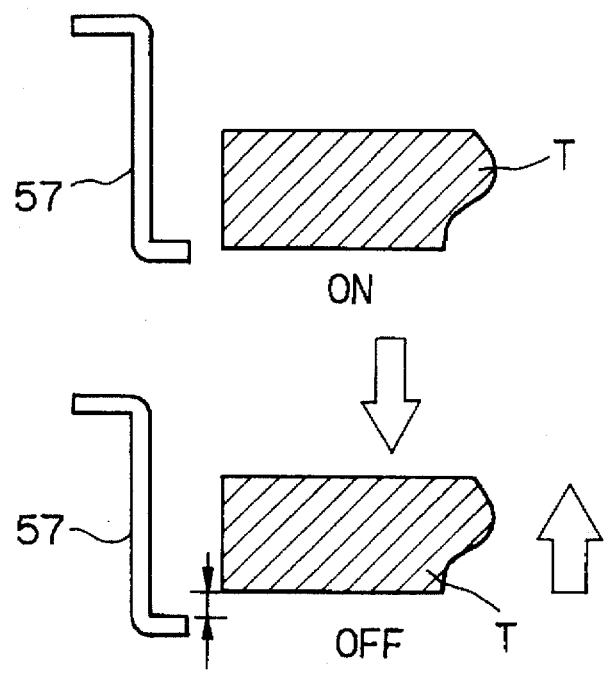
FIG. 29 is a diagram showing the detection of the tray in the take-out upper stage separator.
Figure 30:
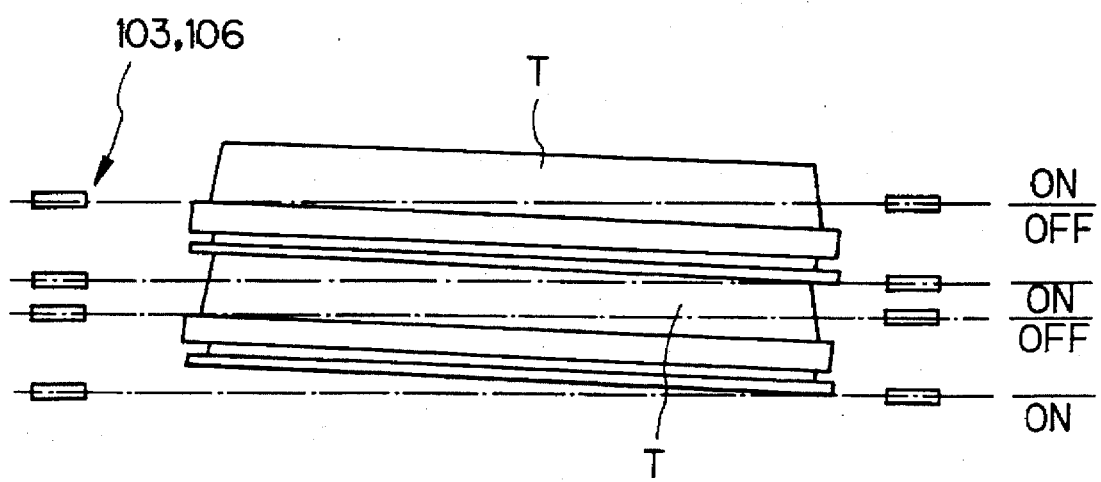
FIG. 30 is a diagram showing the tray detection in take-out intermediate stage and upper stage separators.

FIG. 13 shows an example of the structure of the elevator hanger 53 at the side of the take-in unit 200A of FIG. 10 and the elevator hanger 61 at the side of the take-out unit 200B of FIG. 11. The tray T is placed on the pawls 53a and 61a of the hangers 53 and 61. These hangers 53 and 61 can be opened and closed in the directions of arrows X, for example. The individually two, i.e., totally four hangers 53 and 61 are arranged in the elevator units 21a and 21b, as shown in FIG. 28.

FIG. 14 shows an example of the upper stage separator 55 and the lower stage separator 52 of the take-in unit of FIG. 10 and the upper stage separator 57 and the intermediate separator 58 of FIG. 11.

Positioning Unit 200D

FIG. 15 shows a construction of the positioning unit 200D disposed in the upper stage separator 57 of FIG. 11.

Specifically, this positioning unit 200D is composed of an X-direction pusher 201, an X-direction positioning block 203 and a Y-direction positioning block 205. Moreover, the tray T, as pushed in the direction of arrow Y by the take-in pusher 56 of FIGS. 10 and 15, is pushed onto the Y-direction positioning block 205. By actuating the X-direction pusher 201, moreover, the tray T is pushed onto the X-direction positioning block 203.

As a result, the tray T can be completely positioned in the X- and Y-directions. This positioning unit 200D is within the operating range of the robot 10 of FIG. 2 so that the hands of the robot 10 can pick up the parts in the positioned tray T.

Figure 16:
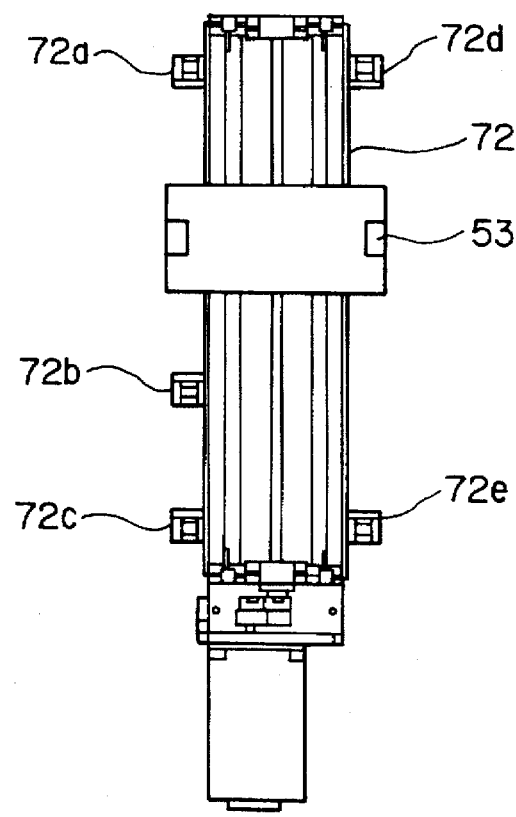
FIG. 16 is a side elevation showing a set of sensors of the take-in unit.

Reference will be made to FIG. 16. The support 72 of FIG. 16 shows a sensor for detecting the position of the hanger 53 of the take-in unit 200A. The support 72 is equipped with a hanger upper stage stop position sensor 72a, a stock area position sensor 72b, a hanger lower stage stop position sensor 72c, an upper stage limit sensor 72d and a lower stage limit sensor 72e.

Figure 17:
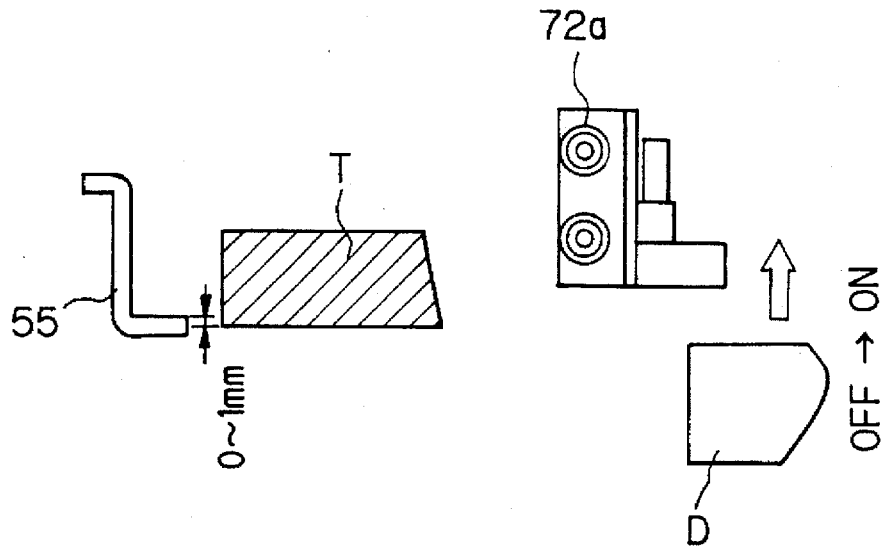
FIG. 17 is a diagram showing a hanger upper stage stop position sensor of FIG. 16.

The hanger upper stage stop position sensor 72a is constructed, as shown in FIG. 17. Specifically, this sensor 72a detects the take-out stop position of the tray T to the upper stage separator 55 when a sheet of tray T is stocked on the hanger 53 of the take-in unit 200A of FIG. 9. The sensor 72a comes into contact with a dog D, when the lower face of the tray T of FIG. 17 is short of the tray receiving face of the upper stage separator 55 by 0 to 1 mm, for example, so that it is turned ON.

Figure 18:
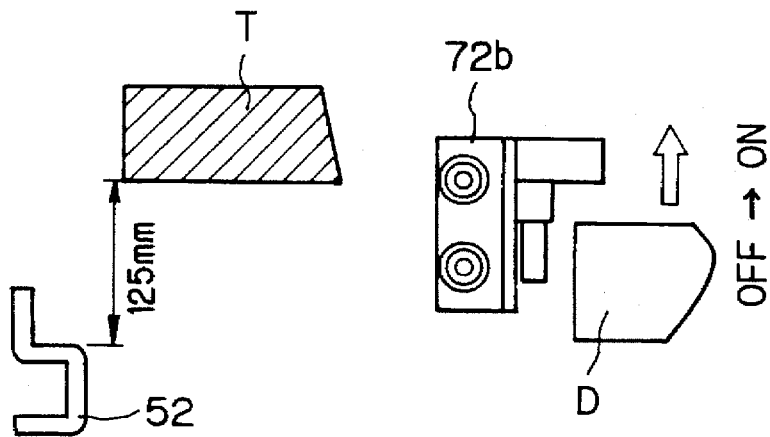
FIG. 18 is a diagram showing a hanger stock area position sensor.

The hanger stock area position sensor 72b of FIG. 18 detects whether or not the hanger 53 stands by in a position away from interference with the tray T on the hanger 53, when the next tray T is brought into the lower stage separator 52 of FIG. 9.

Figure 19:
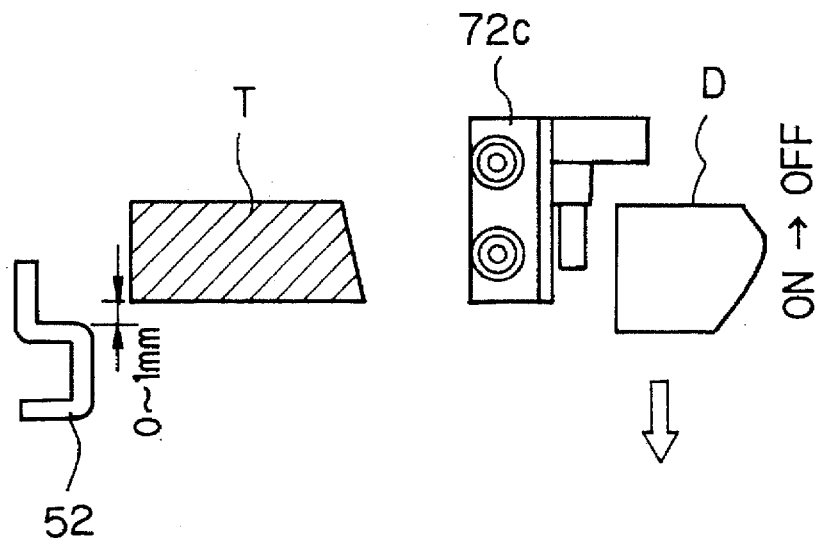
FIG. 19 is a diagram showing a hanger lower stage stop position sensor.

The hanger lower stage stop position sensor 72c shown in FIG. 19 detects the stop position of the hanger 53 when the hanger 53 of FIG. 9 takes the tray T on the lower stage separator 52. When the sensor 72c is turned ON while the hanger 53 descending, the descending speed of the hanger 53 is switched from high to row values. Then, the sensor 72c is turned OFF to stop the descending movement. While the hanger 53 is descending, the sensor 72c is turned OFF when the lower face of the tray T is short of the tray receiving face of the lower stage separator 52 by 0 to 1 mm.

Figure 20:
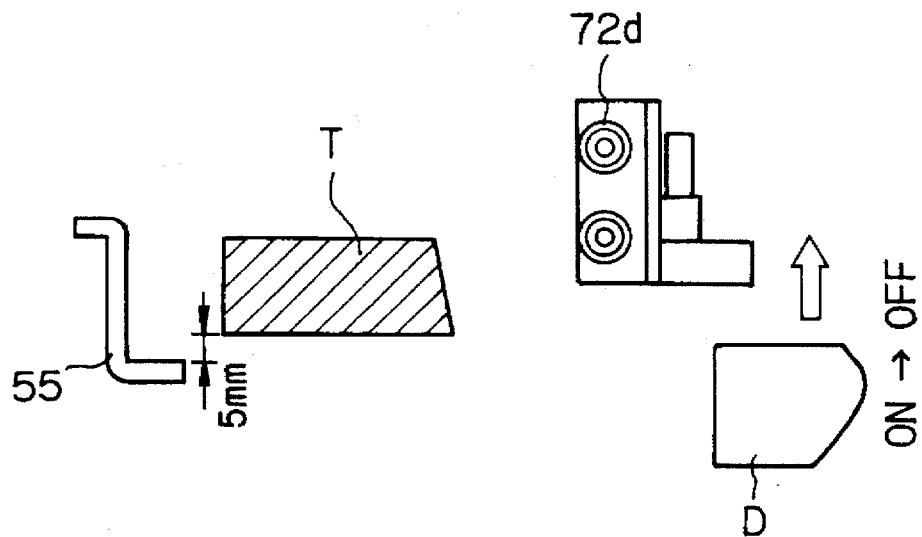
FIG. 20 is a diagram showing a hanger upper limit sensor.

The hanger upper limit sensor 72d shown in FIG. 20 comes into abutment against the dog D and is turned OFF, when the lower face of the tray T runs over the receiving face of the upper stage separator 55 by about 5 mm.

Figure 21:
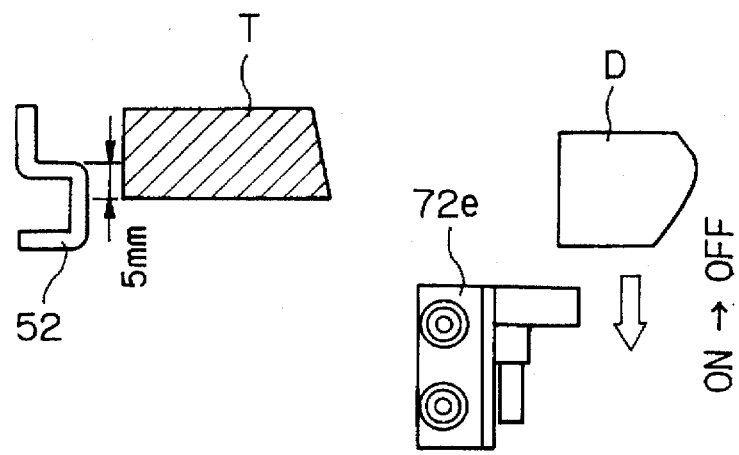
FIG. 21 is a diagram showing a hanger lower limit sensor.

The hanger lower limit sensor 72e of FIG. 21 comes into abutment against the dog D and is turned OFF, when the tray receiving faces of the pawls 53a of the hanger 53 runs over the receiving faces of the lower stage separator 52 of FIG. 10 by about 5 mm.

Figure 22:
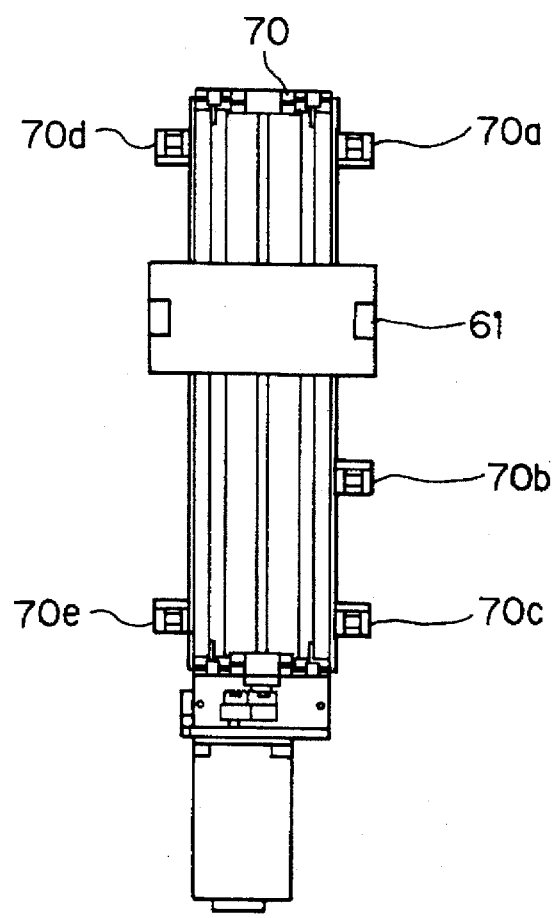
FIG. 22 is a side elevation showing a set of sensors of the take-out unit.

Next, there are shown in FIG. 22 a set of sensors which are mounted on the support 70 of the take-out unit 200B. The support 70 is equipped with a hanger standby position sensor 70a, a hanger intermediate stage stop position sensor 70b, a hanger lower stage stop position sensor 70c, an upper limit sensor 70d and a lower limit sensor 70e.

Figure 23:
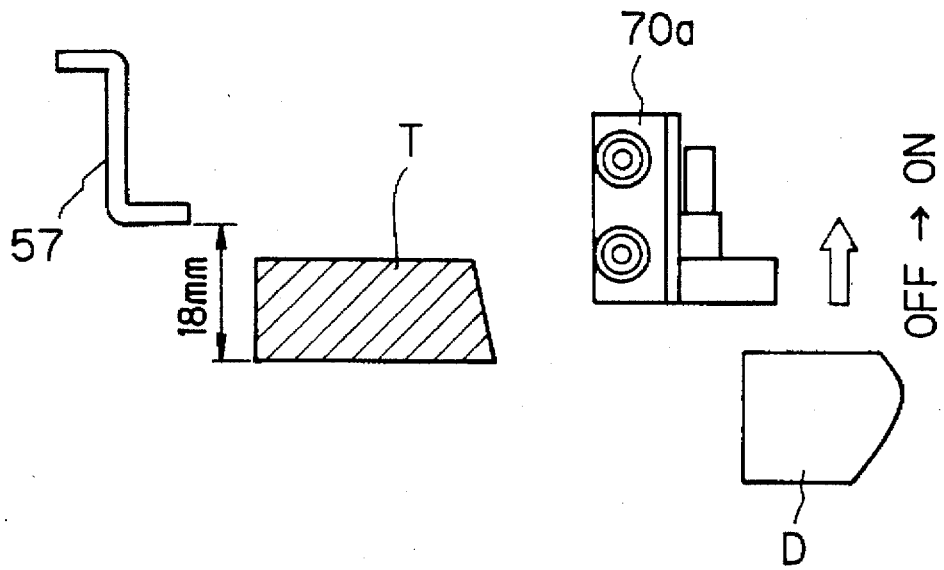
FIG. 23 is a diagram showing a hanger standby position sensor.

The hanger standby position sensor 70a, as shown in FIG. 23, detects the stop position for the standby of the hanger below the upper stage separator 57 while no tray T is stocked for the hanger 61 of the take-out unit 200B of FIG. 11. The sensor 70a comes into abutment against the dog D and is turned ON when the tray receiving faces of the pawls 61a of the hanger 61 are short of the receiving face of the upper stage separator of FIG. 23 by 18 mm, for example.

Figure 24:
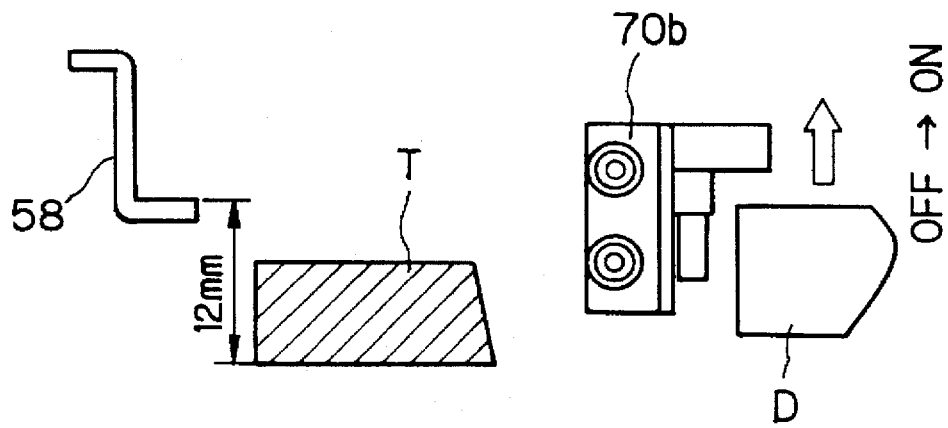
FIG. 24 is a diagram showing a hanger intermediate stage top position sensor.

The hanger intermediate stage stop position sensor 70b of FIG. 24 detects the stop position of the hanger 61 when the hanger 61 takes the tray T on the intermediate stage separator 58 of FIG. 11. This sensor 70b comes into abutment against the dog D and is turned ON when the tray receiving faces of the pawls 61a of the hanger 61 are short of the lower face of the tray T on the intermediate stage sensor 58 by 12 mm, for example.

Figure 25:
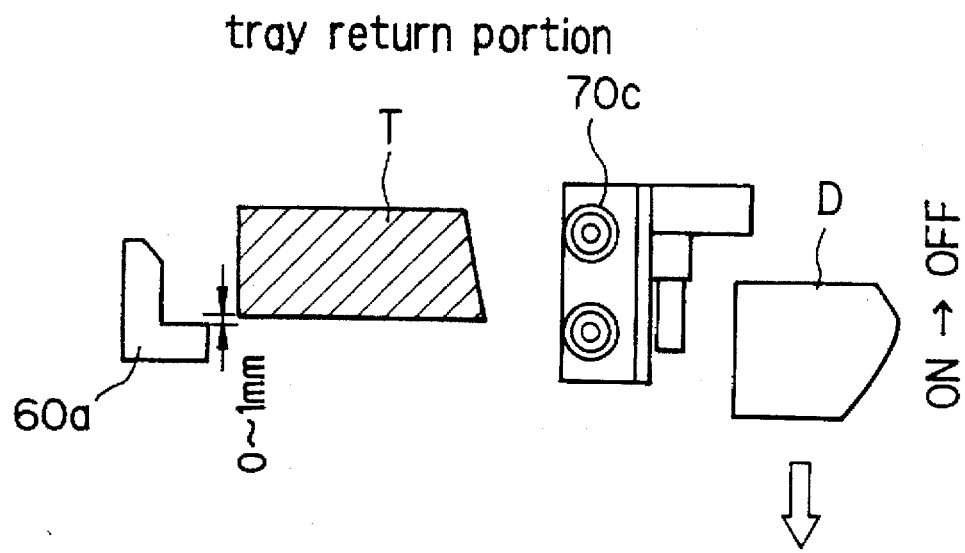
FIG. 25 is a diagram showing a hanger lower stage stop position sensor.

The hanger lower stage stop position sensor 70c of FIG. 25 detects the stop position of the hanger 61 when the tray T is placed on the guide rails 60a of the tray return unit 60. The sensor 70c is turned ON, when the hanger 61 descends, to switch the descending speed from higher to lower values, and is turned OFF by the dog D to stop the descending movement.

Figure 26:
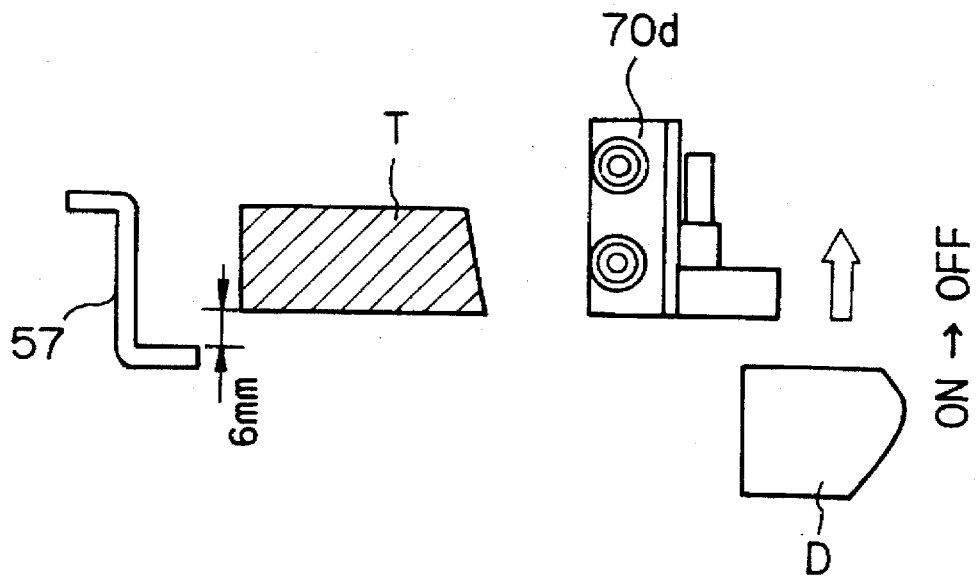
FIG. 26 is a diagram showing a hanger upper limit sensor.

The hanger upper limit sensor 70d, as shown in FIG. 26, detects the overrun of the stop position of the hanger 61 with respect to the upper stage separator 57. The sensor 70d is turned OFF by the dog D when the lower face of the tray T overruns the receiving face of the upper stage separator 57 by 6 mm, for example.

Figure 27:
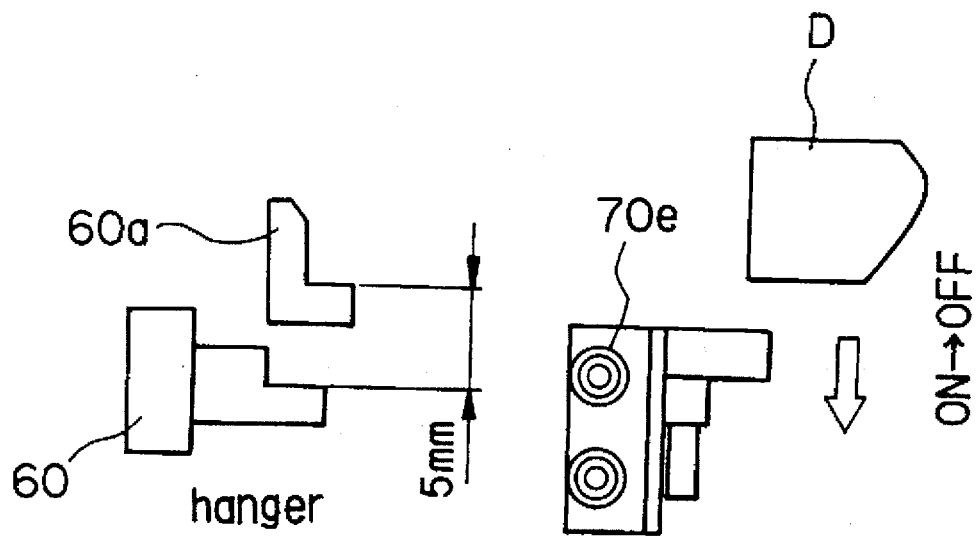
FIG. 27 is a diagram showing a hanger lower limit sensor.

The hanger lower limit sensor 70e of FIG. 27 detects the overrun in the lower stage stop position. The sensor 70e comes into abutment against the dog D and is turned OFF when the tray receiving faces of the pawls 61a of the hanger 61 overrun the guide rails 60a of the tray return portion 60 by 5 mm, for example.

Next, FIG. 28 is a top plan view showing the elevator units 21a and 21b and a set of sensors for detecting the tray T.

In FIG. 28, there are shown: a take-out upper stage separator tray detecting sensor 101; a take-out intermediate separator tray detecting sensor 103; a take-out stock tray upper end detecting sensor 102; a take-in stock tray upper end detecting sensor 104; a take-in hanger stock deceleration detecting sensor 105; a take-in upper stage separator tray detecting sensor 106; and a take-in lower stage separator tray arrival sensor 107.

As shown in FIG. 28, the sensor 101 detects both the arrival of the tray T at the upper stage separator 57 of the take-out unit 200B from the take-in unit 200A and the lift of the tray by the hanger 61 at the take-out time of the tray T. The sensor 101 is turned ON, when the tray T is placed on the upper stage separator 57 of the take-out unit 2008, and OFF when the tray T is floated by about 1 mm from the upper stage separator 57.

The sensors 102 and 104 of FIG. 28 detect the standby positions of the hangers 53 and 61 at the positions short of the upper stage separator 57 if the trays T are stocked on the hangers.

The sensors 104 and 106 detect the trays T when one is taken out from each of the trays T stacked on the take-out intermediate stage separator 58 and the take-in upper stage separator 57.

The sensor 105 of FIG. 28 detects the deceleration position of the hanger 53 of the take-in unit 200A when the tray on the hanger 53 is to be stacked on the trays T on the lower stage separator 52, in case the tray T on the lower stage separator 52 is to be taken while the tray T is stocked on the hanger 53.

The sensor 107 detects the arrival of the tray T which is returned from the take-out lifter to the lower stage separator.

Example of Operations of Parts Feeding Unit 200

Here will be described an example of the operations of the parts feeding unit 200 with reference to FIGS. 31 to 37.

Figure 31:
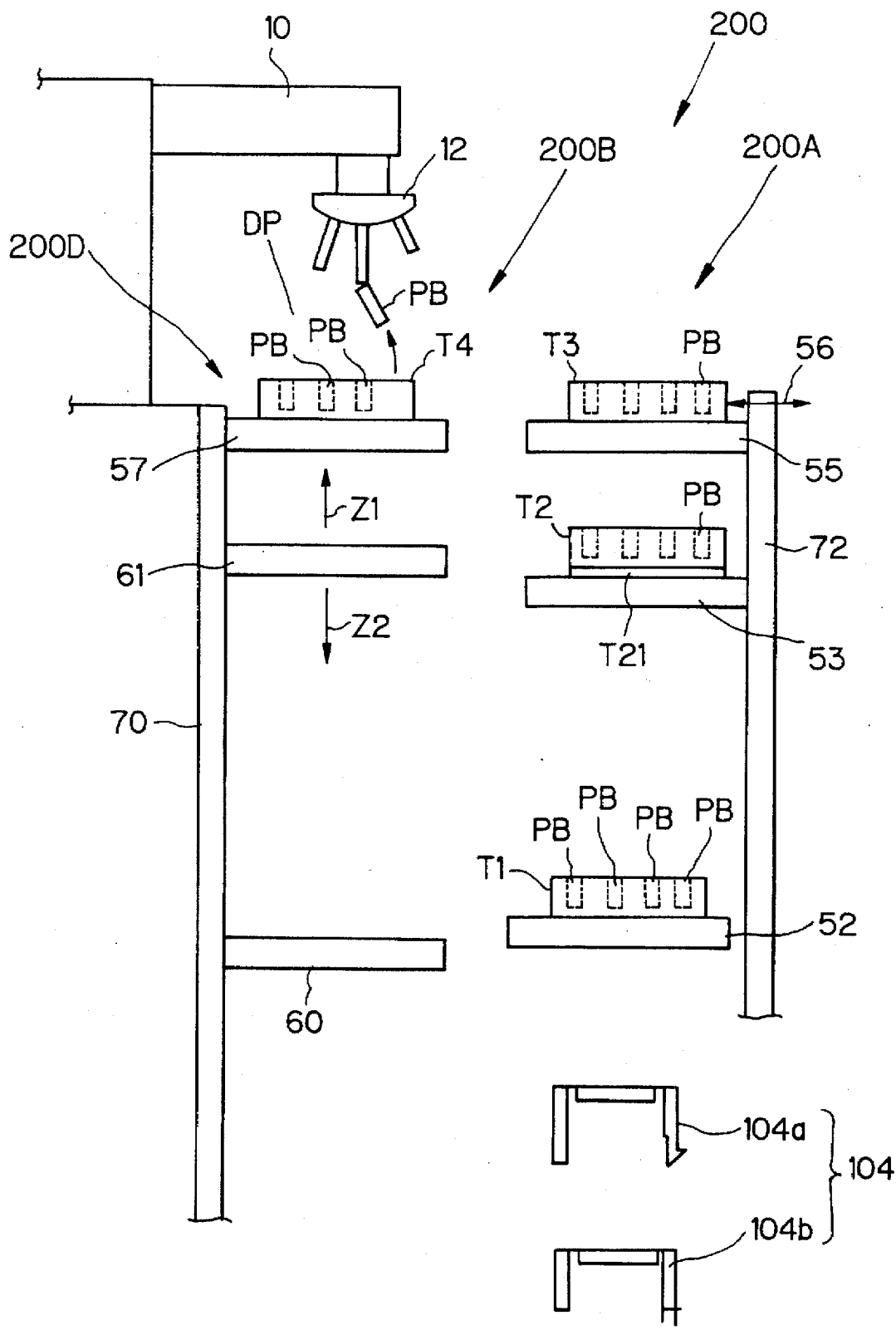
FIG. 31 is a diagram showing an example of the operations of the parts feeding apparatus, in which the parts are taken out from the tray in the positioning unit by the robot turret head.

FIG. 31 shows the take-in unit 200A and the take-out unit 200B of the parts feeding unit 200, the parts feeding conveyor 104, and the robot 10 for taking the parts PB.

In connection with these components, the operations of FIGS. 31 to 37 will be described.

In FIG. 31, the lower stage separator 52, the elevator hanger 53 and the upper stage separator 55 of the take-in unit 200A are respectively arranged with trays T1 to T3. In FIG. 31, first of all, each of the trays T1 to T3 carries a plurality of, e.g., four parts PB.

As shown in FIG. 31, on the other hand, there is placed on the upper stage separator 57 of the take-out unit 200B a tray T4 which carries a plurality of, e.g., four parts PB. This tray T4 is thus positioned in the positioning unit 200D.

In short, in the state of FIG. 31, the plurality of, e.g., four trays T1 to T4 are circulated in the take-in unit 200A and the take-out unit 200B.

Figure 32:
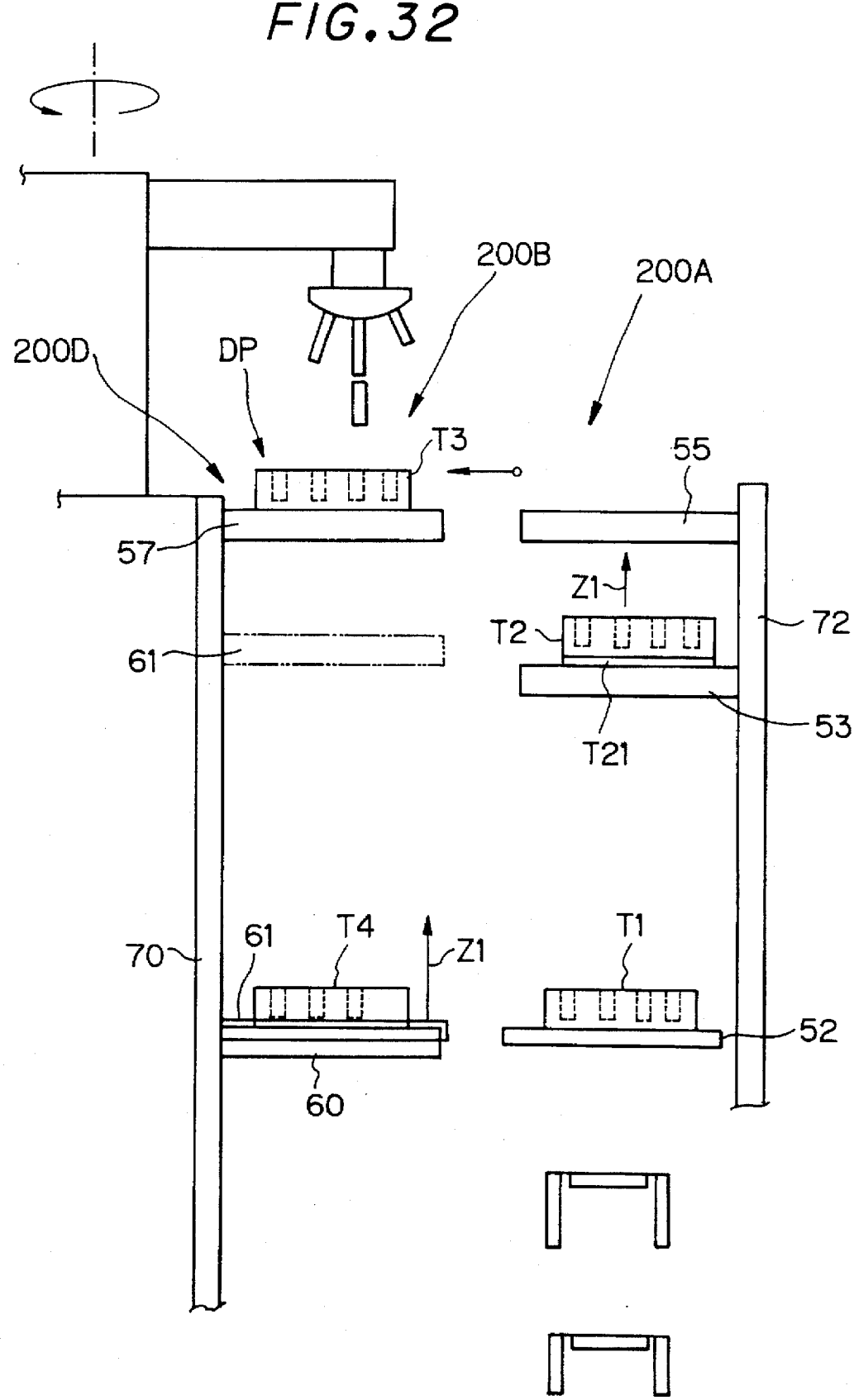
FIG. 32 is a diagram showing the state in which the tray is transferred from the upper stage separator of the take-in unit to the upper stage separator of the take-out unit.

One part PB of the tray T4 is taken up by the turret head 12 of the robot 10, as shown in FIG. 31, and is turned by the robot 1, as shown in FIG. 32. Then, the robot 10 assembles its held part PB with the work W on the assembling pallet PA which is arranged in the assembling pallet positioning unit 17 of FIG. 2. As a result, a plurality of, e.g., three parts PB are left on the tray T4.

When a predetermined part PB is thus taken out of the tray T which is positioned in the determined position DP of the positioning unit 200D of FIG. 31, the hanger 61 rises in the direction of arrow Z1 to take the tray T4 on the upper stage separator 57. This upper stage separator 57 is opened to hand the tray T4 to the hanger 61. This hanger 61 descends in the direction of arrow Z2. As a result, the tray T4 is placed on the return elevator 60, as shown in FIG. 32. Then, the hanger 61 ascends in the Z1 direction until it stands by in the position, as indicated by double-dotted lines in FIG. 32.

Reverting to FIG. 31, on the other hand, the tray T3 placed on the upper stage separator 55 of the take- in unit 200A of FIG. 31 is pushed to the determined position DP at the side of the empty upper stage separator 57 by the action of the pusher 56 of the positioning unit 200D. As a result, as shown in FIG. 32, the tray T3 is transferred to the upper stage separator 57 of the take-out unit 200B and is positioned by the positioning unit 200D.

Since the upper stage separator 55 is emptied, as shown in FIG. 32, the hanger 53 rises in the Z1 direction to transfer the tray T2 to the hanger 55. At this time, this hanger 55 is open so that it can be closed to carry the tray T2.

Figure 33:
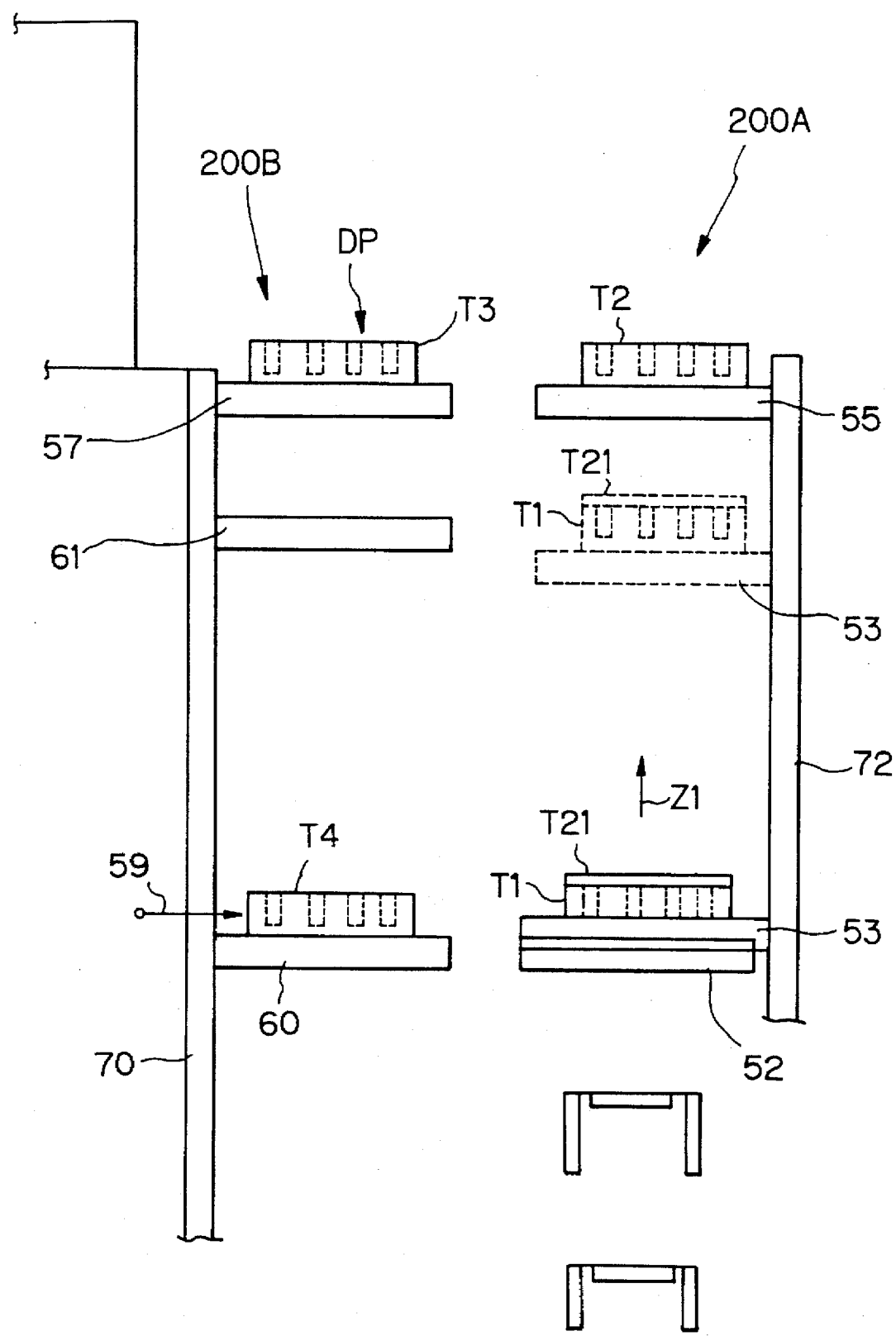
FIG. 33 is a diagram showing the state, in which the tray is transferred to the upper stage separator in the take-out unit by the hanger.

Next, as shown in FIG. 33, the emptied hanger 53 descends toward the lower stage separator 52 to lift a thinner tray T21 and the tray T1 in a stacked state in the Z1 direction.

As a result, the hanger 53 is positioned, as indicated by broken lines in FIG. 33, to position the tray T21 and the tray T1 just below the tray T2.

Figure 34:
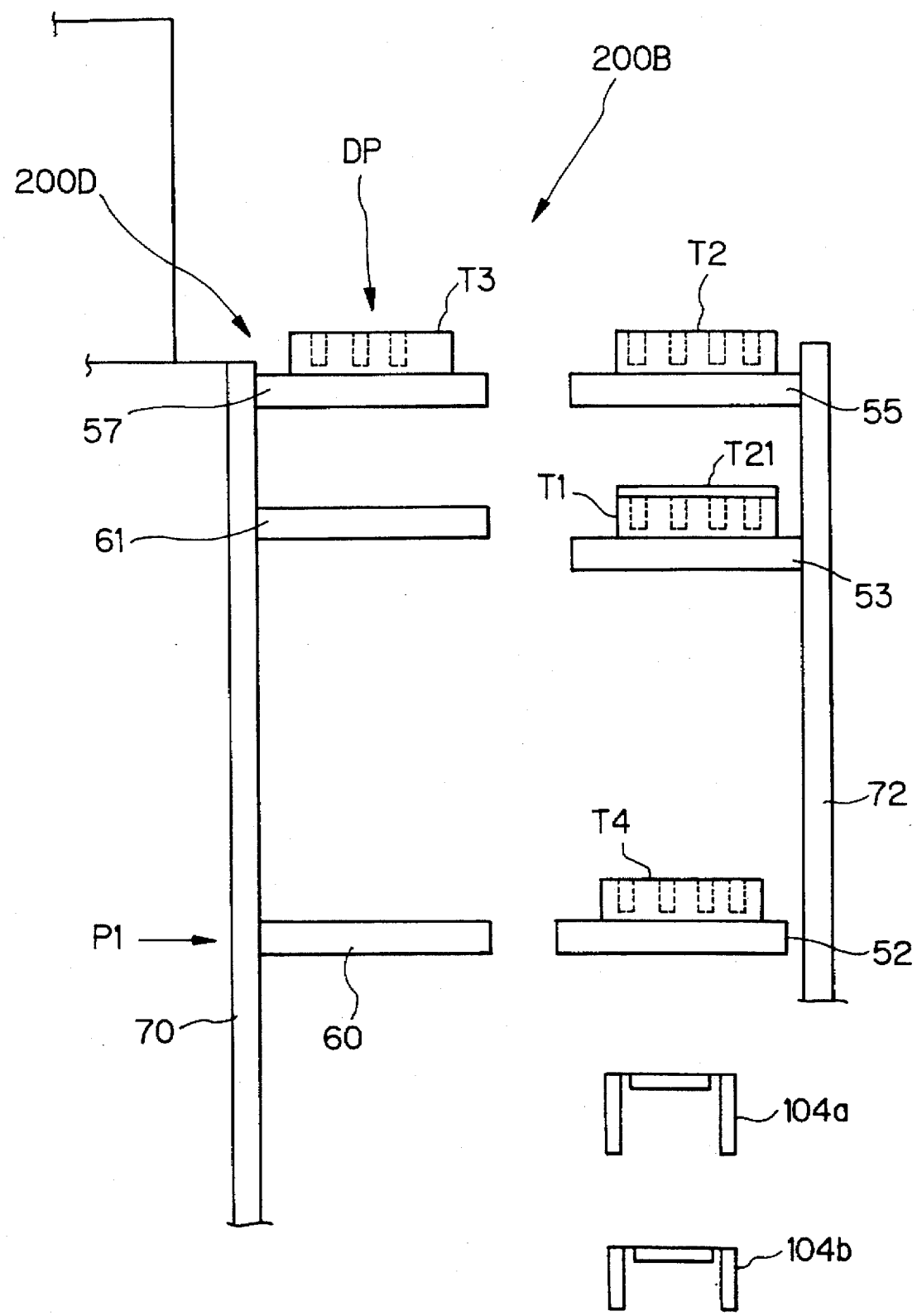
FIG. 34 is a diagram showing the state, in which the tray is transferred to the lower stage separator of the take-in unit by the return elevator in the take-out unit.

As shown in FIG. 34, on the other hand, the tray T4 on the return elevator 60 is transferred to the emptied lower stage separator 52 by actuating the pusher 59 of the take-out unit 200B. Thus, the trays T1, T21, T2, T3 and T4 can be sequentially circulated and positioned in the positioning unit 200D. As a result, the pallet head 12 of the robot 10 can take out the necessary parts PB from the necessary tray T.

Reference will be made on FIG. 35.

Figure 35:
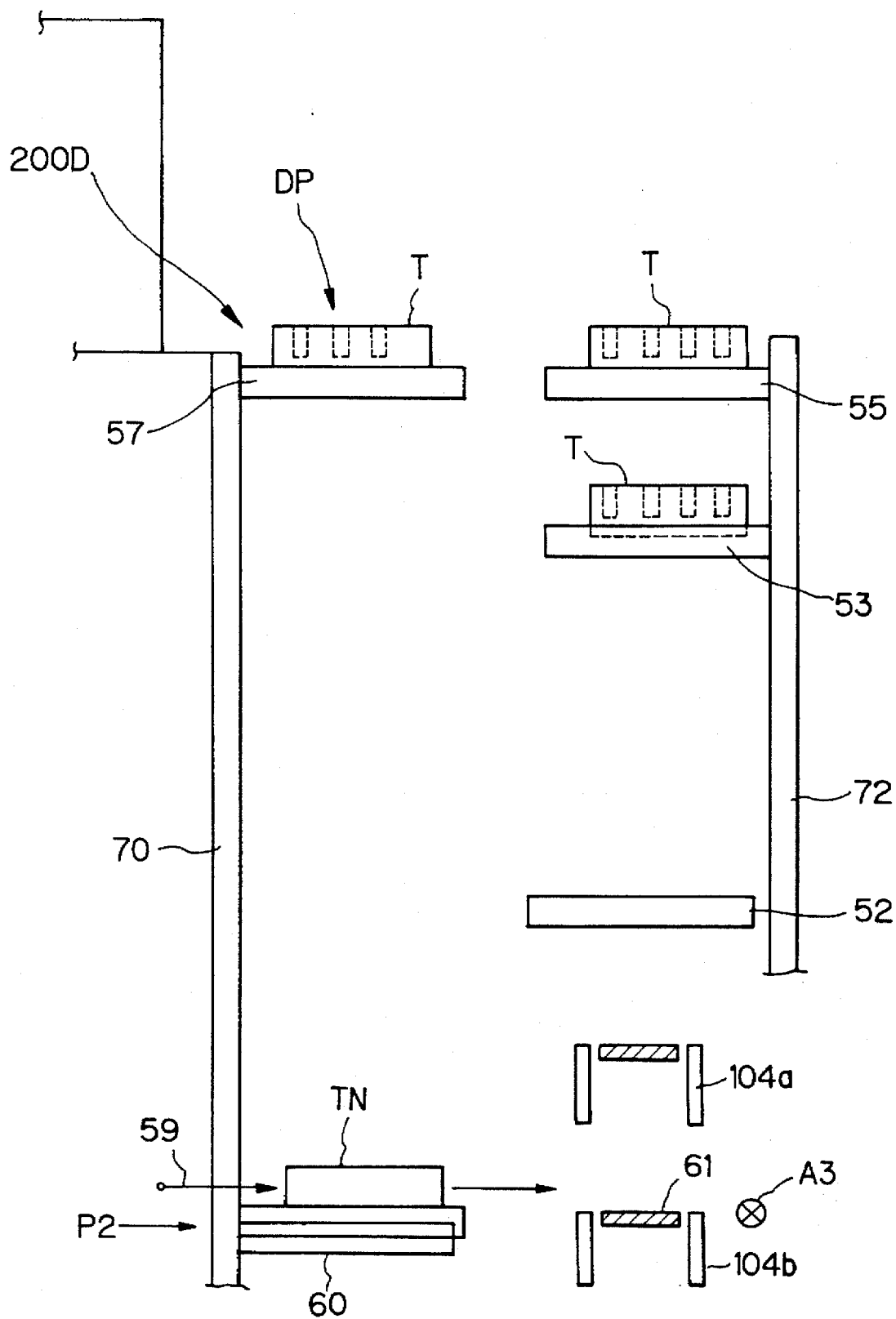
FIG. 35 is a diagram showing that the tray emptied of parts is to be transferred to the lower stage conveyor so that it may be discharged.

In case the take-up (or pick-up) operations of the parts PB advances so far that one pallet TN has its all parts PB taken out to become empty, the return elevator 60 descends from the position P1 of FIG. 34 and is positioned in the position P2 of FIG. 35.

As the pusher 59 acts, the emptied tray TN is transferred to the lifter 61 of the lower stage conveyor 104b. As the lower stage conveyor 104b moves in the direction of arrow A3 (from this side to the other side of the drawing), the tray TN is conveyed by the conveyor unit 53 of FIG. 1.

In case the emptied tray TN is thus discharged, a new tray T0 carrying additional parts PB is taken from the take-in unit 200A and is circulated between the take-in unit 200A and the take-out unit 200B.

Figure 36:
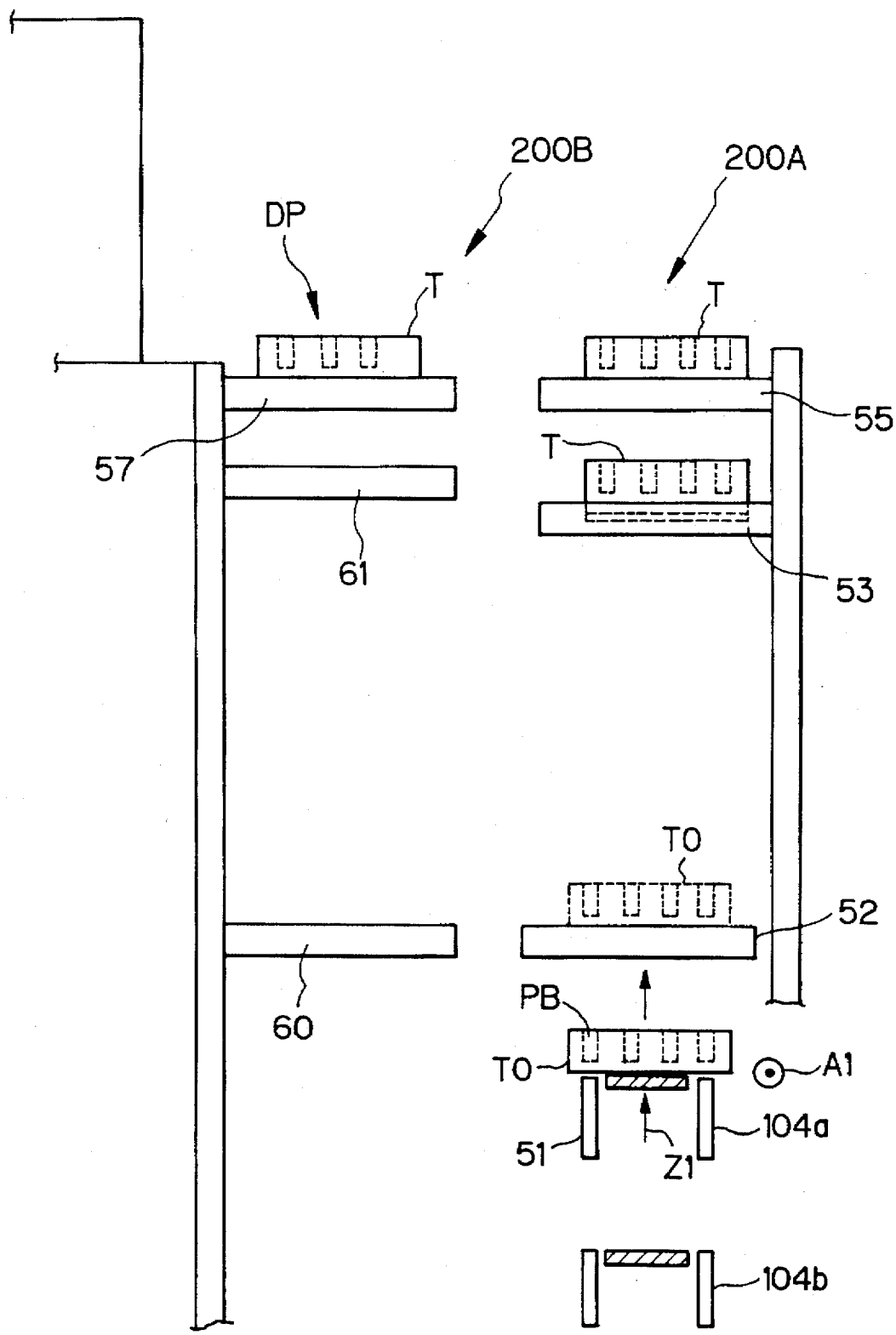
FIG. 36 is a diagram showing the state, in which a new tray is to be added from the outside to a circulation loop formed of the take-in unit and the take-out unit.
Figure 37:
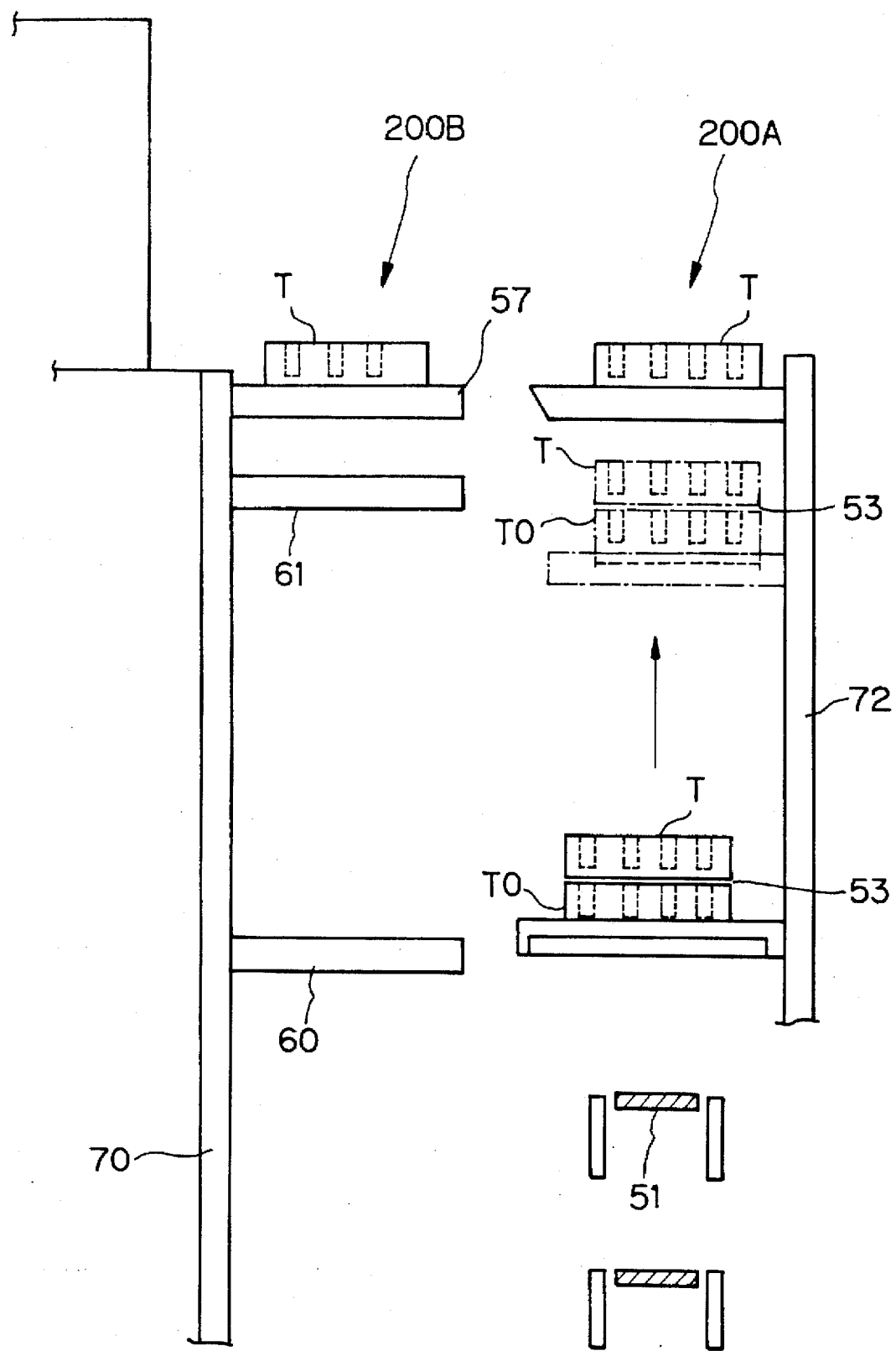
FIG. 37 is a diagram showing the state, in which the newly added tray is to be circulated along the circulation loop.

This new tray T0 is taken, as shown in FIGS. 36 and 37. Specifically, the upper stage conveyor 104a conveys the new tray T0 carrying the parts PB in the direction of arrow A1 (to this side of the drawing). Then, the kind of this tray T0 is decided by the pallet lift 20 of FIG. 2. If this decision reveals that the tray T0 is one carrying the necessary parts, the tray T0 should be circulated and is positioned on the lifter 51.

This lifter 51 lifts up the new tray T0 in the Z1 direction. The tray T0 thus lifted up is placed on the separator 52 and is separated from the lifter 51.

Next, the hanger 53 descends, while having its pawls 53a and 53b (as shown in FIG. 9) opened, to the lower stage separator 52 carrying the new tray T0, and has its pawls 53a closed to lift up the new tray T0 in the Z1 direction.

Since another tray T is placed on the upper stage separator 55 in the example of FIG. 36, the elevator hanger 53 stops just at this side of the upper stage separator 55 so that no interference may occur. Then, the elevator hanger 53 stands by till the tray T on the upper stage separator 55 is transferred to the next upper stage separator 57.

Incidentally, the next tray stands by, if necessary, on the return elevator 60 till there newly comes the tray carrying the parts of the same kind as that of the parts of the tray TN returned, as shown in FIG. 35. Moreover, the next and later trays T can be stopped over the return separator 58 shown in FIG. 9, so that the parts can be fed without disturbing the sequential circulation of the trays T.

As has been described hereinbefore, ten or more kinds of parts can be repeatedly fed to the robot 10 by the tray T, and four kinds of parts, for example, can be fed by the pallets which are supplied from the parts feeders 52 of FIG. 1. According to this embodiment, therefore, a total of fourteen kinds of parts can be fed to the robots 10 and assembled with the works.

The exchange of the kinds of the devices to be assembled can be effected by exchanging those trays and pallets and the pallet head to effect the multi-kind and small-quantity production.

By providing each assembling robot cell with that circulation type parts feeding apparatus, moreover, the apparatus size and the line space can be reduced by 50% or more, as compared with the prior art, to spare the space.

Moreover, the stock of the parts in the assembly line can be reduced.

Still moreover, the capacity of the utilities such as the air pressure or the electric power can be reduced to spare the power consumption.

As described above, still moreover, the exchange of the device kinds can be easily coped with to improve the flexibility. It is further possible to improve the quality of the assembly.

Incidentally, the present invention should not be limited to the embodiment thus far described.

In the foregoing embodiment, the take-in unit and the take-out unit are so circulated to move the trays in the vertically upward direction and in the vertically downward direction. The circulation should not limited thereto, but there may naturally be formed a trapezoidal or rhombic circulation loop, along which those units ascend or descend at an angle with respect to the vertical direction.

Moreover, although the assembly robot of the embodiment is equipped with the turret head for taking out the parts, it should not be limited thereto but may be equipped with a robot hand.

Although the parts feeding unit of the embodiment is equipped with the two pairs of take-in units and take-out units, it should not be limited thereto but may be equipped with one pair or three pairs or more of take-in units and take-out units.

As has been described hereinbefore, according to the present invention, it is possible to spare the space, to reduce the parts stock in the line and to easily cope with the exchange of the device kinds.

What is claimed is:

1. A parts feeding apparatus for feeding parts which are disposed on a plurality of trays, to an assembling body for assembly, comprising:

conveyor means for conveying the plurality of trays to and from the assembling body; and transferring and positioning means for individually transferring and positioning each of the plurality of trays, which are conveyed by said conveyor means, in a predetermined position within said assembling body, in which each of the parts can be selected from a tray positioned in the predetermined position and assembled by robot means included in the assembly body;

wherein said transferring and positioning means includes:

a first transfer unit for individually transferring each of the plurality of trays upward in a first direction from said conveyor means;

a positioning unit for positioning each tray from said first transfer unit in the predetermined position which is within an assembling range of the robot means included in the assembling body; and a second transfer unit for selectively transferring each tray which has been positioned in the predetermined position, downward from the predetermined position in a second direction reversed from said first direction, and for delivering the tray to said first transfer unit when the tray still contains parts, and for delivering the tray to said conveyor means when the tray is empty.

2. A parts feeding apparatus for feeding parts for a work, on a tray to an assembling body for assembling the parts, comprising:

conveyor means for conveying said parts carrying tray to and from said assembling body, and transferring and positioning means for transferring and positioning a plurality of said trays, which are conveyed by said conveyor means to said assembling body, wherein said transferring and positioning means includes:

a first transfer unit for transferring said parts carrying tray upward in a first direction from said conveyor means;

a positioning unit for positioning said parts carrying tray from said first transfer unit in a determined position within an assembling range of said assembling body; and a second transfer unit for transferring said parts carrying tray positioned in said determined position, downward in a second direction reversed from said first direction, to said first transfer unit or for discharging said tray emptied of said parts to said conveyor means;

wherein said conveyor means includes: an introducing conveyor arranged for feeding said first transfer unit with said parts carrying tray; and a discharging conveyor for discharging said tray emptied of said parts from said second transfer unit; and wherein said first transfer unit of said transferring and positioning means includes:

a lifter for taking said parts carrying tray from said introducing conveyor;

a separator for releasably holding said parts carrying tray separately of said lifter;

a tray setter for setting said parts carrying tray in a predetermined position; and an elevator hanger for transferring said parts carrying tray from said separator to said tray setter.

3. A parts feeding apparatus as set forth in claim 2, wherein said first direction is vertically upward whereas said second direction is vertically downward.

4. A parts feeding apparatus as set forth in claim 2, wherein said first transfer unit, said second transfer unit and said positioning unit are arranged in said assembling body.

5. A parts feeding apparatus as set forth in claim 2, wherein said introducing conveyor and said discharging conveyor are arranged one over the other, and wherein the direction for said introducing conveyor to introduce said tray and the direction for said discharging conveyor to discharge said tray are made to intersect the moving directions of said tray including said first direction and said second direction in said transferring and positioning means.

6. A parts feeding apparatus as set forth in claim 2, wherein said second transfer unit of said transferring and positioning means includes:

a separator to which is transferred said parts carrying tray by said positioning unit from the tray setter of said first transfer unit;

a return elevator for transferring said parts carrying tray from said separator to said lifter of said first transfer unit or for discharging the tray emptied of said parts to said discharging conveyor of said conveyor means; and an elevator hanger for transferring said tray from said separator to said return elevator.

7. A parts feeding apparatus as set forth in claim 2, wherein said separator, said tray setter and said elevator hanger of said first transfer unit can be opened or closed to removably mount said parts carrying tray.

8. A parts feeding apparatus as set forth in claim 6, wherein said separator and said elevator hanger of said second transfer unit can be opened or closed to removably mount said parts carrying tray.

9. A parts feeding apparatus as set forth in claim 2, wherein said assembling body is a robot for assembling the parts in said tray into said work.

10. A parts feeding apparatus as set forth in claim 9, wherein said assembling body is equipped with a turret head for assembling the parts in said tray into said work.

11. A parts feeding apparatus as set forth in claim 2, further comprising pallet transfer means for transferring a pallet carrying said work to said assembling body.

12. A part feeding apparatus for feeding parts which are disposed on a plurality of trays, to an assembly robot, comprising:

conveyor means for continuously conveying said plurality of trays along a conveyor line in a first direction toward the assembly robot when the trays contain parts, and in a second direction away from the assembly robot when the trays are empty; and a transferring and positioning arrangement for transferring and positioning each of the plurality of said trays, which are conveyed by said conveyor means, to the assembly robot, and locating each tray in a position wherein the parts disposed thereon can be taken by the assembly robot, said transferring and positioning arrangement including:

first transfer means for sequentially transferring the trays upward from said conveyor means;

positioning means for positioning each of the trays which has been transferred by said first transfer unit, in a predetermined position within reach of the assembly robot; and second transfer means for selectively transferring each tray, after it has been positioned in said predetermined position, downward from the predetermined position to said first transfer means when the tray still contains parts and to said conveyor means when the tray is empty.

* * * * *